(12) United States Patent
Tamaki et al.

(10) Patent No.: US 9,777,101 B2
(45) Date of Patent: Oct. 3, 2017

(54) ISOPRENE COPOLYMER AND METHOD OF PRODUCING THE SAME

(71) Applicant: BRIDGESTONE CORPORATION, Tokyo (JP)

(72) Inventors: Satoru Tamaki, Kodaira (JP); Junko Matsushita, Tachikawa (JP); Shojiro Kaita, Oizumi-machi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/408,812

(22) PCT Filed: Jul. 11, 2013

(86) PCT No.: PCT/JP2013/004298
§ 371 (c)(1),
(2) Date: Dec. 17, 2014

(87) PCT Pub. No.: WO2014/010248
PCT Pub. Date: Jan. 16, 2014

(65) Prior Publication Data
US 2015/0232602 A1    Aug. 20, 2015

(30) Foreign Application Priority Data

Jul. 12, 2012 (JP) ................................. 2012-156910
Jul. 12, 2012 (JP) ................................. 2012-156911

(51) Int. Cl.
*C08F 297/04* (2006.01)

(52) U.S. Cl.
CPC ................................. *C08F 297/046* (2013.01)

(58) Field of Classification Search
CPC ..... C08F 297/046; C08F 236/08; C08L 25/10
See application file for complete search history.

(56) References Cited

U.S. PATENT DOCUMENTS

| 5,194,500 | A | 3/1993 | Chin et al. | |
|---|---|---|---|---|
| 5,612,436 | A | 3/1997 | Halasa et al. | |
| 6,147,164 | A * | 11/2000 | Hsu | B60C 1/0016 525/314 |
| 6,180,717 | B1 * | 1/2001 | Kawazura | B60C 1/00 525/241 |
| 2005/0004333 | A1 | 1/2005 | Laubry | |
| 2005/0233894 | A1 | 10/2005 | Kaita et al. | |
| 2010/0190940 | A1 | 7/2010 | Nakagawa et al. | |
| 2011/0263803 | A1 * | 10/2011 | Suzuki | C08F 36/04 526/127 |

FOREIGN PATENT DOCUMENTS

| CN | 101796084 A | 8/2010 |
|---|---|---|
| CN | 101906187 A * | 12/2010 |
| EP | 1640412 A1 | 3/2006 |
| EP | 2873697 A1 | 5/2015 |
| JP | 1153739 A | 6/1989 |
| JP | 5-255540 A | 10/1993 |
| JP | 7-508297 A | 9/1995 |
| JP | 9-118729 A | 5/1997 |
| JP | 2000-154221 A | 6/2000 |
| JP | 2002-12702 A | 1/2002 |
| JP | 2004-027179 A | 1/2004 |
| JP | 2006-274219 A | 10/2006 |
| JP | 2007-63240 A | 3/2007 |
| JP | 2008-291096 A | 12/2008 |
| JP | 2009-191100 A | 8/2009 |
| JP | 2012156913 A | 8/2012 |
| RU | 2109753 C1 | 4/1998 |
| RU | 2152407 C1 | 7/2000 |
| WO | 2006/078021 A1 | 7/2006 |
| WO | 2010/074255 A1 | 7/2010 |

OTHER PUBLICATIONS

International Search Report for PCT/JP2013/004298 dated Oct. 8, 2013 [PCT/ISA/210].
Communication dated Nov. 24, 2015 from the Japanese Patent Office in counterpart application No. 2012-156910.
Communication dated Nov. 24, 2015 from the Japanese Patent Office in counterpart application No. 2012-156911.
Machine translation of CN101906187A cited in Office Action dated Mar. 2, 2016 in U.S. Appl. No. 14/408,812.
Yingtai Jin et al., "Copolymerization of styrene with butadiene and isoprene using a rare earth catalyst", Polymer Communications, 1996, vol. 37, No. 2, pp. 349-352.
WPI/Thomson, XP-002753258, 2010, 9 pgs. total.

* cited by examiner

*Primary Examiner* — Mark Kaucher
(74) *Attorney, Agent, or Firm* — Sughrue Mion, PLLC

(57) ABSTRACT

A copolymer having properties (durability (fracture resistance, abrasion resistance, and crack-growth resistance)) similar to those of natural rubber and a method of producing the copolymer are provided. An isoprene copolymer has a styrene block or a butadiene block at a terminal thereof, wherein styrene monomers account for less than 5 mol % of all monomers forming the isoprene copolymer having the styrene block; butadiene monomers account for 10 mol % or less of all monomers forming the isoprene copolymer having the butadiene block; and cis-1,4 bond content of a portion derived from isoprene accounts for at least 95% in total.

5 Claims, No Drawings

ISOPRENE COPOLYMER AND METHOD OF PRODUCING THE SAME

CROSS REFERENCE TO RELATED APPLICATIONS

This application is a National Stage of International Application No. PCT/JP2013/004298, filed on Jul. 11, 2013, which claims priority from Japanese Patent Application Nos. 2012-156910, and 2012-156911, both filed on Jul. 12, 2012, the contents of all of which are incorporated herein by reference in their entirety.

TECHNICAL FIELD

The present invention relates to an isoprene copolymer and a method of producing the isoprene copolymer.

BACKGROUND ART

In recent years, under social demands for energy conservation, in order to improve fuel consumption of a vehicle, durability of a tire has been required, and thus a variety of rubber materials with excellent fracture resistance, abrasion resistance, and crack-growth resistance have been desired. Also, due to soaring prices of natural rubber, it has been required to develop synthetic rubber having the durability similar to that of the natural rubber. Although synthetic polyisoprene has conventionally been used as an alternative to the natural rubber, there has been a problem that the synthetic polyisoprene used as a rubber composition has poor durability as compared with the natural rubber. Therefore, in order to improve the durability of the synthetic polyisoprene, it has conventionally been performed to improve elongation crystallinity by structuring synthetic polyisoprene having higher cis (For example, see Patent Documents 1 and 2).

There have also been known techniques that improve a desired rubber property by kneading the synthetic polyisoprene together with other polymer components, or by using a copolymer composed of isoprene and other monomers. For example, Patent Document 3 discloses a rubber composition for a tread of a tire composed of a styrene-isoprene copolymer and a styrene-butadiene copolymer. Also, Patent Document 4 discloses a rubber composition containing butadiene-isoprene as a rubber component.

RELATED ART DOCUMENTS

Patent Documents

Patent Document 1: Japanese Patent Application Publication No. 2004-27179
Patent Document 2: WO2006/078021
Patent Document 3: Japanese Patent Application Publication No. 5-255540
Patent Document 4: Japanese Patent Application Publication No. 2009-191100

SUMMARY OF INVENTION

Technical Problem

An object of the present invention is to provide an isoprene copolymer that allows for the obtainment of a rubber composition having properties similar to those of the natural rubber (durability (the fracture resistance, the abrasion resistance, and the crack-growth resistance)) and a production method of the isoprene copolymer. Another object of the present invention is to provide a rubber composition and a tire those having excellent durability (the fracture resistance, the abrasion resistance, and the crack-growth resistance).

Solution to Problem

In order to solve the above problems, the present invention provides an isoprene copolymer having a styrene block or a butadiene block at a terminal thereof, wherein styrene monomers account for less than 5 mol % of all monomers forming the isoprene copolymer having the styrene block; butadiene monomers account for 10 mol % or less of all monomers forming the isoprene copolymer having the butadiene block; and cis-1,4 bond content of a portion derived from isoprene accounts for at least 95% in total. Since styrene or butadiene contained in the isoprene copolymer is maintained at a certain amount or less, properties of polyisoprene similar to those of natural rubber are maintained. Also, the cis-1,4 bond content of the portion derived from isoprene is increased, thereby allowing for the obtainment of rubber having properties more similar to those of the natural rubber and thus having excellent durability.

A method of producing an isoprene (styrene-isoprene) copolymer having a styrene block at a terminal produced by synthesizing a polymer or an oligomer in polymerization of a styrene monomer in the presence of a catalyst and adding an isoprene monomer to the polymer or the oligomer for polymerization, wherein styrene monomers account for less than 5 mol % of all monomers forming a styrene-isoprene copolymer, and cis-1,4 bond content of a portion derived from isoprene accounts for at least 95% in total.

A method of producing isoprene (butadiene-isoprene) copolymer having a butadiene block at a terminal produced by synthesizing a polymer or an oligomer in polymerization of a butadiene monomer in the presence of a catalyst and adding the isoprene monomer to the polymer or the oligomer for polymerization, wherein butadiene monomers account for 10 mol % or less of all monomers forming a butadiene-isoprene copolymer, and cis-1,4 bond content of a portion derived from isoprene accounts for at least 95% in total.

Another method of producing a butadiene-isoprene copolymer produced by mixing a butadiene monomer and an isoprene monomer in the presence of a catalyst for polymerization, wherein butadiene monomers account for 10 mol % or less of all monomers forming the butadiene-isoprene copolymer, and cis-1,4 bond content of a portion derived from isoprene accounts for at least 95% in total.

Effect of the Invention

According to the present invention, an isoprene copolymer that allows for the obtainment of a rubber composition having properties (durability (fracture resistance, abrasion resistance, and crack-growth resistance)) similar to those of natural rubber may be produced. Also, a rubber composition and a tire having excellent durability (the fracture resistance, the abrasion resistance, and the crack-growth resistance) may be provided.

DESCRIPTION OF EMBODIMENT (Isoprene Copolymer)

An isoprene copolymer according to the present invention is a styrene-isoprene copolymer or a butadiene-isoprene copolymer and, hereinafter, also referred to simply as a "copolymer".

The copolymer is characterized in having a styrene block or a butadiene block at a terminal thereof. Here, the terminal refers to either one or both ends of a copolymer main chain. That is, the copolymer main chain has the styrene block or the butadiene block at least one end thereof.

When a ratio of a styrene portion or a butadiene portion (a hard segment) of the isoprene copolymer is too high, an advantage of properties of polyisoprene similar to those of the natural rubber, such as durability, may not be fully exhibited. In order to have the properties similar to those of the natural rubber, polyisoprene is required to have the high cis content in a microstructure thereof. For a conventional isoprene copolymer, however, a technique to adjust the styrene or butadiene content of the copolymer while forming an isoprene portion with the high-cis content has not been studied at all.

Styrene in the copolymer is detected by means of NMR and GPC. In using the NMR, since phenyl protons of styrene may be observed near 7 ppm, a ratio thereof to a detected value of isoprene is calculated, thereby obtaining an abundance ratio of styrene. In using the GPC, on the other hand, an absorption peak at 254 nm of styrene is utilized to calculate a ratio of the detected value of isoprene to a detected value of styrene (absorbance of 254 nm).

Further, the presence of butadiene in the copolymer is checked by using $^1$H-NMR. In a simple substance of polyisoprene, a signal of a 1,4 bond proton is observed near 5.1 ppm, and a signal of a 3,4 bond proton is observed near 4.7 ppm. In butadiene copolymer, on the other hand, the signal of the 1,4 bond proton is observed near 5.4 ppm, and the signal of the 3,4 bond proton is observed near 4.8 ppm.

In the isoprene copolymer described above, the number of monomer units per one styrene block or one butadiene block is preferably 1 to 10. Also, molecular weight per one styrene block or one butadiene block is preferably no more than 1000. When the styrene block or the butadiene block in the copolymer is too large, properties of polyisoprene is highly likely damaged. Therefore, a size of the styrene block or the butadiene block is limited to a certain value or smaller such that durability (fracture resistance, abrasion resistance, and crack-growth resistance) of polyisoprene may be maintained. Note that the number and the molecular weight of a monomer unit of the styrene butadiene block and the butadiene block is calculated from a ratio of the signal of the isoprene block to the signal of the styrene block or the butadiene block by using the $^1$H-NMR.

—Chain Structure—

There is no particular restriction on a chain structure of the copolymer other than a distal portion thereof and any chain structure may be selected according to an intended purpose. For example, a block copolymer, a random copolymer, a tapered copolymer, and an alternating copolymer may be mentioned. As described later, however, since the copolymer of the present invention includes a small unit quantity of butadiene monomer, the copolymer, other than the distal portion thereof, preferably has a structure of polyisoprene similar to what is called the block copolymer.

—Block Copolymer—

A structure of the block copolymer is any one of $(A-B)_x$, $A-(B-A)_x$, and $B-(A-B)_x$ (here, A represents a block portion formed by a monomer unit of isoprene; B represents a block portion formed by a monomer unit of a compound other than isoprene; and x represents an integer of at least 1). Note that a block copolymer including a plurality of structures of (A-B) or (B-A) is referred to as a multiblock copolymer.

—Random Copolymer—

The random copolymer has a structure in which the monomer unit of isoprene and the monomer unit of the compound other than isoprene are arranged at random.

—Tapered Copolymer—

The tapered copolymer is a copolymer having a mixture of the random copolymer and the block copolymer, in which at least one of a block portion (also referred to as a block structure) composed of the monomer unit of isoprene and a block portion composed of the monomer unit of the compound other than isoprene are irregularly arranged.

The structure of the tapered copolymer includes a discontinuous or continuous distribution of a component of isoprene and a component of the compound other than isoprene.

—Alternating Copolymer—

The alternating copolymer is a copolymer having a structure in which isoprene and a compound other than isoprene are arranged alternately (a molecular chain structure of -ABABABAB-, provided that A refers to the monomer unit of isoprene, and B refers to the monomer unit of the compound other than isoprene).

—Styrene Content—

When the copolymer of the present invention is a styrene-isoprene polymer, styrene accounts for more than 0 mol % and less than 5 mol % of total monomer units of the copolymer. Limiting the ratio of styrene to less than 5 mol % offers an advantage to improve the durability (the fracture resistance, the abrasion resistance, and the crack-growth resistance) without losing the properties of isoprene.

—Butadiene Content—

When the copolymer of the present invention is a butadiene-isoprene polymer, butadiene accounts for 10 mol % or less, preferably less than 5 mol % of total monomer units of the copolymer. Limiting the ratio of butadiene to 10 mol % or less offers the advantage to improve the durability (the fracture resistance, the abrasion resistance, and the crack-growth resistance) without losing the properties of isoprene.

—Cis-1,4 Bond Content—

Cis-1,4 bond content of a portion derived from isoprene in the copolymer is, in total, at least 95%, preferably at least 97%, particularly preferably at least 98%. When the cis-1,4 bond content is at least 95% in total, sufficient stretching crystallinity may be exhibited.

On the other hand, when the cis-1,4 bond content is within the preferable range or the particularly preferable range described above, it is advantageous in terms of improvement in the durability due to the stretching crystallinity.

Note that the is-1,4 bond content (the same applies to trans-1,4 content and 3,4-vynl bond content described later) is an amount in the portion derived from isoprene, not a ratio of the amount to the entire isoprene copolymer.

—Trans-1,4 Bond Content—

Although trans-1,4 bond content of the portion derived from isoprene of the copolymer is not particularly limited and may be appropriately selected based on an intended purpose, it is preferably 5% or less, more preferably 3% or less.

When the trans-1,4 bond content is 1% or less, sufficient stretching crystallinity may be exhibited.

Also, when the trans-1,4 bond content is within the more preferable range or the particularly preferable range described above, it is further advantageous in terms of improvement in the durability due to the stretching crystallinity.

—3,4-Vinyl Bond Content—

Although 3,4-vinyl bond content of the portion derived from isoprene of the copolymer is not particularly limited and may be appropriately selected based on an intended purpose, it is preferably 5% or less, more preferably 3% or less, particularly preferably 1% or less. When the 3,4-vinyl bond content is 5% or less, sufficient stretching crystallinity may be exhibited.

When the 3,4-vinyl bond content is within the more preferable range or the particularly preferable range described above, it is further advantageous in terms of improvement in the durability due to the stretching crystallinity.

—1,2-Vinyl Bond Content—

Although 1,2-vinyl bond content of the portion derived from isoprene of the copolymer is not particularly limited and may be appropriately selected based on an intended purpose, it is preferably 5% or less, more preferably 3% or less, particularly preferably 1% or less.

When the 1,2-vinyl bond content is 5% or less, sufficient stretching crystallinity may be exhibited.

Also, when the 1,2-vinyl bond content is within the more preferable range or the particularly preferable range described above, it is further advantageous in terms of improvement in the durability due to the stretching crystallinity.

—Number Average Molecular Weight—

Although number average molecular weight (Mn) of the copolymer is not particularly limited and may be appropriately selected based on an intended purpose, it is preferably 0.4 million to 2.5 million, more preferably 0.5 million to 2.5 million. When the molecular weight is 2.5 million or less, excellent processability may be maintained. The number average molecular weight (Mn) is obtained by means of gel permeation chromatography (GPC) using polystyrene as a reference substance.

—Molecular Weight Distribution (Mw/Mn)—

Although a molecular weight distribution (Mw/Mn) expressed by a ratio of weight average molecular weight (Mw) to the number average molecular weight (Mn) is not particularly limited and may be appropriately selected based on an intended purpose, it is preferably 1 to 5. Here, the molecular weight distribution (Mw/Mn) is obtained by means of gel permeation chromatography (GPC) using polystyrene as the reference substance.

—Method of Producing Styrene-Isoprene Copolymer—

Next, a method that allows for the production of the styrene-isoprene copolymer described above will be described in detail. The method of producing the styrene-isoprene copolymer according to the present invention includes at least a polymerization process and, as necessary, a coupling process, a cleaning process, and other steps that are appropriately selected. In producing the copolymer, as first polymerization process, it is preferable to add, without isoprene, a styrene monomer alone in the presence of a catalyst for polymerization. Especially in using a polymerization catalyst composition described later, since isoprene is more reactive than styrene, the polymerization of styrene in the presence of the styrene monomer and an isoprene monomer becomes difficult. Also, it tends to be difficult to polymerize isoprene first and then add styrene later, due to properties of the catalyst.

—Polymerization Method—

As a polymerization method, any method such as a solution polymerization method, a suspension polymerization method, a liquid-phase bulk polymerization method, an emulsion polymerization method, a gas phase polymerization method, a solid phase polymerization method and the like may be used. Also, in using a solvent for a polymerization reaction, any solvent that is inert in the polymerization reaction may be used, and such a solvent may be, for example, toluene, cyclohexane, n-hexane, and mixtures thereof.

—Styrene Polymerization Process—

In a first polymerization process, in the presence of the catalyst, it is preferable to add the styrene monomer alone for polymerization without adding isoprene. At this time, an amount of styrene monomer to add and a reaction time are appropriately selected, thereby adjusting molecular weight of a polymer or an oligomer produced.

In the polymerization process, the polymerization reaction of isoprene occurs in an atmosphere of an inert gas, preferably nitrogen gas or argon gas. Polymerization temperature of the polymerization reaction is not particularly limited but may be, for example, preferably within a range of −100° C. to 200° C., or approximately at room temperature. Note that raising the polymerization temperature may cause a reduction in cis-1,4 selectivity in the polymerization reaction. Also, pressure of the polymerization reaction, in order to take sufficient amount of isoprene into a polymerization reaction system, is preferably within a range of 0.1 to 10.0 MPa. Further, although a reaction time of the polymerization reaction in order to generate an oligomer having 10 or less styrene units is preferably within a range of 1 to 900 minutes, the reaction time may be appropriately selected based on a type of the catalyst, the polymerization temperature and the like. Note that, when the reaction temperature is 25° C. to 80° C., the reaction time is preferably 5 to 300 minutes.

—Isoprene Polymerization Process—

In a second polymerization process, it is preferable to add the isoprene monomer to a reaction product of the polymerized styrene described above for additional polymerization of the isoprene monomer with a styrene polymer or a styrene oligomer. Especially in using a catalyst described below, due to properties thereof, the polymerization reaction tends to migrate from styrene to the isoprene, and thus a copolymer similar to block copolymer is produced at high rates.

In the isoprene polymerization process, the polymerization reaction occurs in the atmosphere of the inert gas, preferably nitrogen gas or argon gas. Polymerization temperature of the polymerization reaction is not particularly limited but may be, for example, preferably within the range of −100° C. to 200° C., or approximately at room temperature. Note that raising the polymerization temperature may cause the reduction in cis-1,4 selectivity in the polymerization reaction. Also, the pressure of the polymerization reaction, in order to take sufficient amount of isoprene into the polymerization reaction system, is preferably within the range of 0.1 to 10.0 MPa. Further, a reaction time of the polymerization reaction is not particularly limited but is, for example, preferably within a range of 1 second to 10 days. However, the reaction time may be appropriately selected based on conditions such as a type of the catalyst, the polymerization temperature and the like.

In the isoprene polymerization process, also, a polymerization terminator such as methanol, ethanol, isopropanol and the like may be used to stop the polymerization.

—Method of Producing Butadiene-Isoprene Copolymer—

Next, a method that allows for the production of the butadiene-isoprene copolymer described above will be described in detail. The method of producing the butadiene-isoprene copolymer according to the present invention includes at least a polymerization process and, as necessary, further includes the coupling process, the cleaning process, and other steps that are appropriately selected.

—First Polymerization Reaction Method—

The polymerization process of the method of producing the butadiene-isoprene copolymer according to the present invention is executed by either one of a first polymerization reaction method and a second polymerization reaction method. In the first polymerization method, in the presence of the catalyst, first, a small amount of butadiene monomer alone is preferably added without adding isoprene for polymerization of butadiene monomer. When butadiene monomer is polymerized generating a polymer or an oligomer, a large amount of isoprene is added for competitive polymerization of isoprene with the polymer or the oligomer.

—Polymerization Method—

For any of the above polymerization, as the polymerization method, the solution polymerization method, the suspension polymerization method, the liquid-phase bulk polymerization method, the emulsion polymerization method, the gas phase polymerization method, the solid phase polymerization method and the like may be employed. Also, in using a solvent for the polymerization reaction, any solvent that is inert in the polymerization reaction may be used, and such a solvent may be, for example, toluene, cyclohexane, n-hexane, and mixtures thereof.

—Butadiene Polymerization Process—

In a first polymerization process, in the presence of the catalyst, first, the butadiene monomer alone is added for polymerization without adding isoprene. At this time, an amount of butadiene monomer to add and a reaction time are appropriately selected, thereby adjusting molecular weight of a polymer or an oligomer produced.

In the butadiene polymerization process, the polymerization reaction occurs in the atmosphere of the inert gas, preferably nitrogen gas or argon gas. Polymerization temperature of the polymerization reaction described above is not particularly limited but may be, for example, preferably within the range of −100° C. to 200° C., or approximately at room temperature. Note that raising the polymerization temperature may cause the reduction in the cis-1,4 selectivity in the polymerization reaction. Also, the pressure of the polymerization reaction, in order to take sufficient amount of butadiene into the polymerization reaction system, is preferably within the range of 0.1 to 10.0 MPa.

Further, although a reaction time of the polymerization reaction in order to generate an oligomer having 10 or less butadiene units is preferably within the range of 1 to 900 minutes, the reaction time may be appropriately selected based on a type of the catalyst, the polymerization temperature and the like. Note that, when the reaction temperature is 25° C. to 80° C., the reaction time is preferably 5 to 300 minutes.

—Isoprene Polymerization Process—

Next, into the reaction product of the butadiene polymerization described above, isoprene monomer in a molar amount of at least 9 times that of butadiene is preferably added for additional polymerization of the isoprene monomer with a butadiene polymer or a butadiene oligomer. A large amount of isoprene is added such that, in competition with the butadiene monomer, the isoprene monomer reacts more easily.

In the isoprene polymerization process, the polymerization reaction occurs in the atmosphere of the inert gas, preferably nitrogen gas or argon gas. Polymerization temperature of the polymerization reaction described above is not particularly limited but may be, for example, preferably within the range of −100° C. to 200° C., or approximately at room temperature. Note that raising the polymerization temperature may cause the reduction in the cis-1,4 selectivity in the polymerization reaction. Also, the pressure of the polymerization reaction, in order to take sufficient amount of isoprene into the polymerization reaction system, is preferably within the range of 0.1 to 10.0 MPa. Further, a reaction time of the polymerization reaction is not particularly limited but is, for example, preferably within the range of 1 second to 10 days. However, the reaction time may be appropriately selected based on conditions such as a type of the catalyst, the polymerization temperature and the like.

In the isoprene polymerization process, also, the polymerization terminator such as methanol, ethanol, isopropanol and the like may be used to stop the polymerization.

—Second Polymerization Reaction Method—

As another embodiment of the polymerization process of the method of producing the butadiene-isoprene copolymer according to the present invention, there is a method to add the butadiene monomer and the isoprene monomer in the presence of a catalyst for a polymerization reaction. Especially, in using a polymerization catalyst composition described later, the butadiene monomer is more reactive than the isoprene monomer. Therefore, when the butadiene monomer and the isoprene monomer coexist in the reaction system, the butadiene monomer is likely to show the polymerization reaction first. When a residual amount of the butadiene monomer becomes low as the polymerization reaction proceeds, polymerization of the isoprene monomer tends to easily occur in competition with a small amount of the butadiene monomer. Thereby, a butadiene-isoprene copolymer having the butadiene block at the terminal may be produced.

—Polymerization Method—

As the polymerization method, any method such as the solution polymerization method, the suspension polymerization method, the liquid-phase bulk polymerization method, the emulsion polymerization method, the gas phase polymerization method, the solid phase polymerization method and the like may be used. Also, in using a solvent for the polymerization reaction, any solvent that is inert in the polymerization reaction may be used, and such a solvent may be, for example, toluene, cyclohexane, n-hexane, and mixtures thereof.

—Polymerization Process—

According to the second polymerization reaction method, in the presence of the catalyst, the butadiene monomer and the isoprene monomer are added substantially at the same time for polymerization. At this time, a molar amount of the butadiene monomer to add is 10% or less of a total molar amount of the isoprene monomer and the butadiene monomer. Based on a mixing ratio of the butadiene monomer, the number of butadiene monomer units in the butadiene block at the terminal of a produced copolymer and molecular weight of the butadiene block may be adjusted.

In the polymerization process, the polymerization reaction occurs in the atmosphere of the inert gas, preferably nitrogen gas or argon gas. Polymerization temperature of the polymerization reaction described above is not particularly limited but may be, for example, preferably within the range of −100° C. to 200° C., or approximately at room temperature. Note that raising the polymerization temperature may cause the reduction in the cis-1,4 selectivity in the polymerization reaction. Also, the pressure of the polymerization reaction, in order to take sufficient amount of butadiene into the polymerization reaction system, is preferably within the range of 0.1 to 10.0 MPa. Further, a reaction time of the polymerization reaction is not particularly limited but is, for example, preferably within the range of 1 second to 10 days. However, the reaction time may be appropriately selected based on conditions such as a type of the catalyst, the polymerization temperature and the like. Further, although the reaction time of the polymerization reaction in order to generate the oligomer having 10 or less butadiene units is preferably within the range of 1 to 900 minutes, the reaction time may be appropriately selected based on a type of the catalyst, the polymerization temperature and the like. Note that, when the reaction temperature is 25° C. to 80° C., the reaction time is preferably 5 to 300 minutes.

In the polymerization process described above, also, the polymerization terminator such as methanol, ethanol, isopropanol and the like may be used to stop the polymerization.

—Polymerization Catalyst Composition—

Each of the above styrene polymerization processes, butadiene polymerization process, and isoprene polymerization process preferably includes a process to polymerize each of the monomers in the presence of polymerization catalysts described below, a first polymerization catalyst composition, a second polymerization catalyst composition, or a third polymerization catalyst composition.

—Initial Polymerization Catalyst Composition—

An initial polymerization catalyst composition (hereinafter, also referred to as a "first polymerization catalyst composition") will be described.

The first polymerization catalyst composition may include a polymerization catalyst composition including:

component (A): a rare earth element compound or a reaction product of the rare earth element compound and a Lewis base that include no bond between the rare earth element and carbon, and component (B): at least one selected from a group including an ionic compound (B-1) composed of a non-coordinating anion and a cation, aluminoxane (B-2), and one halogen compound (B-3) including at least one of Lewis acid and an organic compound containing a complex compound of metal halide and the Lewis base and active halogen.

When the first polymerization catalyst composition includes at least one of the ionic compound (B-1) and the halogen compound (B-3), the polymerization catalyst composition further includes a component (C), which is an organic metal compound expressed by the following general formula (X):

(provided that the Y represents metal selected from Group 1, Group 2, Group 12, and Group 13 of the periodic table; the $R^1$ and the $R^2$ represent a hydrocarbon group having 1 to 10 carbon atoms or a hydrogen atom; the $R^3$ represents the hydrocarbon group having 1 to 10 carbon atoms; the $R^1$, the $R^2$, and the $R^3$ may be identical to or different from one another; when the Y represents metal selected from Group 1 of the periodic table, the a is 1 and the b and the c are 0; when the Y represents metal selected from Group 2 or Group 12 of the periodic table, the a and the b are 1 and the c is 0; and when the Y represents metal selected from Group 13 of the periodic table, the a, b, and C are all 1).

Since the ionic compound (B-1) and the halogen compound (B-3) described above do not include a carbon atom to be supplied to the component (A), the above component (C) is required as a carbon supply source to the component (A). Note that, also when the above polymerization catalyst composition includes the aluminoxane (B-2) described above, the polymerization catalyst composition may include the above component (C). Also, the first polymerization catalyst composition may contain components other than those contained in a normal rare-earth-element-compound-based polymerization catalyst composition such as, for example, a co-catalyst.

Note that, in the polymerization reaction system, concentration of the (A) component in the first polymerization catalyst composition is preferably within a range of 0.1 to 0.0001 mol/l.

Further, the polymerization catalyst composition preferably contains an additive D that may be an anionic ligand.

The component (A) used for the first polymerization catalyst composition described above is the rare earth element compound or the reaction product of the rare earth element compound and the Lewis base. Here, neither the rare earth element compound nor the reaction product of the rare earth element compound and the Lewis base has binding between the rare earth element and carbon. When neither the rare earth element compound nor the reaction product has binding between the rare earth element and carbon, an obtained compound is stable and easy to handle. Here, the rare earth element compound refers to a compound containing lanthanoid composed of elements with atomic numbers from 57 to 71 of the periodic table, or scandium, or yttrium.

In particular, lanthanoid may include, for example, lanthanum, cerium, praseodymium, neodymium, promethium, samarium, europium, gadolinium, terbium, dysprosium, holmium, erbium, thulium, ytterbium, and lutetium. Note that the aforementioned component (A) may be used alone or in combination with one or more others.

Also, the rare earth element compound is preferably salt or a complex compound with divalent or trivalent rare earth metal, and more preferably a rare earth element compound including one or more ligands selected from a hydrogen atom, a halogen atom, and an organic compound residue. Further, the rare earth element compound or the reaction product of the rare earth element compound and the Lewis base may be expressed by the following general formula (XI) or (XII):

(provided that the $M^{11}$ represents a lanthanoid element, scandium or yttrium; the $X^{11}$ independently represents a hydrogen atom, a halogen atom, an alkoxide group, a thiolate group, an amide group, a silyl group, an aldehyde residue, a ketones residue, a carboxylic acid residue, a thiocarboxylic acid residue, or a phosphorus compound residue; the $L^{11}$ represents the Lewis base; and w is 0 to 3).

A group (ligand) bonded to the rare earth element of the rare earth element compound described above may be, in particular, a hydrogen atom; aliphatic alkoxy groups such as a methoxy group, an ethoxy group, a propoxy group, an n-butoxy group, an isobutoxy group, a sec-butoxy group, and a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopehtylphenoxy group; aliphatic thiolate groups such as a thiometoxy group, a thioethoxy group, a thiopropoxy group, a thio-n-butoxy group, a thioisoptoxy group, a thio-sec-butoxy group, and a thio-tert-butoxy group; arylthiolate groups such as a thiophenoxy group, a 2,6-di-tert-butyl thiophenoxy group, a 2,6-diisopropylthio phenoxy group, a 2,6-dineopenthyl thiophenoxy group, a 2-tert-butyl-6-isopropyl thiophenoxy group, a 2-tert-butyl-6-thioneopentyl phenoxy group, a 2-isopropyl-6-thioneopenthyl phenoxy group, a 2,4,6-triisopropyl thiophenoxy group and the like; aliphatic amide groups such as a dimethylamide group, a diethylamide group, a diisopropylamide group and the like; arylamide groups such as a phenylamide group, a 2,6-di-tert-butylphenylamide group, a 2,6-diisopropyl phenylamide group, a 2,6-dineopenthyl phenylamide group, a 2-tert-butyl-6-isopropyl phenylamide group, a 2-tert-butyl-6-neopenthyl phenylamide group, a 2-isopropyl-6-neopenthyl phenylamide group, a 2,4,6-tert-butyl phenylamide group and the like; bistrialkylamide groups such as a bistrimethyl silylamide group; silyl groups such as a trimethylsilyl group, a tris(trimethylsilyl)silyl group, a bis(trimethylsilyl)methylsilyl group, a trimethylsilyl(dimethyl)silyl group, a triisopropylsilyl(bistrimethylsilyl)silyl group and the like; halogen atoms such as a fluorine atom, a chlorine atom, a bromine atom, an iodine atom and the like. Further, aldehyde residues such as salicylaldehyde, 2-hydroxy-1-naphthaldehyde, 2-hydroxy-3-naphthaldehyde and the like; hydroxyphenone residues such as 2'-hydroxy acetophenone, 2'-hydroxy butyrophenone, 2'-hydroxy propiophenone and the like; diketone residues such as acetylacetone, benzoyl acetone, propionyl acetone, isobutyl acetone, valeryl acetone, ethyl acetylacetone and the like; carboxylic acid residues such as isovaleric acid, caprylic acid, octanoic acid, lauric acid, myristic acid, palmitic acid, stearic acid, isostearic acid, oleic acid, linoleic acid, cyclopentane carboxylic acid, naphthenic acid, ethylhexanoic acid, Vival acid, Versatic acid [products of Shell Chemicals Japan Ltd., synthetic acid composed of a mixture of isomers of C10 monocarboxylic acid], phenylacetic acid, benzoic acid, 2-naphthoic acid, maleic acid, succinic acid and the like; thiocarboxylic acid residues such as hexanethio acid, 2,2-dimethylbutanthio acid, decanthio acid, thiobenzoic acid and the like; phosphonic acid ester residues such as dibutyl phosphate, dipentyl phosphate, dihexyl phosphate, diheptyl phosphate, dioctyl phosphate, bis(2-ethylhexyl)phosphate, bis(1-methylheptyl)phosphate, dilauryl phosphate, dioleyl phosphate, diphenyl phosphate, bis(p-nonylphenyl)phosphate, bis(polyethyleneglycol-p-nonylphenyl)phosphate, (butyl)(2-ethylhexyl)phosphate, (1-methylheptyl)(2-ethylhexyl) phosphate,(2-ethylhexyl)(p-nonylphenyl)phosphate and the like; phosphonic ester residues such as 2-ethylhexyl phosphonic acid monobutyl, 2-ethylhexyl phosphonic acid mono-2-ethylhexyl, phenyl phosphonic acid mono-2-ethylhexyl, 2-ethylhexyl phosphonic acid mono-p-nonylphenyl, phosphonic acid mono-2-ethylhexyl, phosphonic acid mono-1-methylheptyl, phosphonic acid mono-p-nonylphenyl and the like; and phosphinic acid residues such as dibutyl phosphinic acid, bis(2-ethylhexyl)phosphinic acid, bis(1-methylheptyl)phosphinic acid, dilaurylphosphinic acid, dioleylphosphinic acid, diphenylphosphinic acid, bis(p-nonylphenyl)phosphinic acid, butyl(2-ethylhexyl)phosphinic acid,(2-ethylhexyl) (1-methylheptyl) phosphinic acid,(2-ethylhexyl)(p-nonylphenyl)phosphinic acid, butylphosphinic acid, 2-ethylhexylphosphinic acid, 1-methylheptyl phosphinic acid, oleyl phosphinic acid, lauryl phosphinic acid, phenyl phosphinic acid, p-nonylphenyl phosphinic acid and the like may be mentioned. Note that these ligands may be used alone or in combination with one or more others.

In the component (A) used for the polymerization catalyst composition described above, the Lewis base to react with the rare earth element compound may be, for example, tetrahydrofuran, diethyl ether, dimethyl aniline, trimethyl phosphine, lithium chloride, neutral olefin, neutral diolefin and the like. Here, when the rare earth element compound described above reacts with a plurality of Lewis bases (when w is 2 or 3 in the formulae (XI) and (XII), the Lewis base $L^{11}$ may be either identical to or different from each other.

Preferably, the rare earth element compound described above contains a compound expressed by the following formula:

(provided that the M represents at least one selected from lanthanide, scandium, and yttrium; and the $NQ^1$, the $NQ^2$, and the $NQ^3$ represent an amide group and may be either identical to or different from one another and have M-N binding).

That is, the compound expressed by the above formula (i) is characteristic in having three M-N bindings. Having three M-N bindings is advantageous in terms of allowing each binding to be chemically equivalent and making a structure stable, thereby facilitating handling.

In the above formula (i), the amide group represented by the NQ may be any one of the aliphatic amide groups such as a dimethylamide group, a diethylamide group, a diisopropylamide group and the like; arylamide groups such as phenylamide group, a 2,6-di-tert-butylphenylamide group, a 2,6-diisopropyl phenylamide group, a 2,6-dineopenthyl phenylamide group, a 2-tert-butyl-6-isopropyl phenylamide group, a 2-tert-butyl-6-neopenthyl phenylamide group, a 2-isopropyl-6-neopenthylphenylamide group, a 2,4,6-tert-butyl phenylamide group and the like; and bistrialkylamide groups such as a bistrimethyl silylamide group. However, the bistrimethyl silylamide group is preferable.

The component (B) used for the first polymerization catalyst composition described above is at least one compound selected from a group including the ionic compound (B-1), aluminoxane (B-2), and the halogen compound (B-3). Note that a molar amount of the total content of the compound (B) in the first polymerization catalyst composition described above is preferably 0.1 to 50 times that of the component (A).

The ionic compound (B-1) described above is composed of the non-coordinating anion and the cation and may be ionic compounds those react with the rare earth element compound or the reaction product of the rare earth element compound and the Lewis base as the above component (A) and may generate a cationic transition metal compound. Here, the non-coordinating anion may include, for example, tetraphenyl borate, tetrakis(monofluorophenyl)borate, tetrakis(difluorophenyl)borate, tetrakis(trifluoromethyl)borate, tetrakis(tetrafluorophenyl)borate, tetrakis (pentafluorophenyl)borate, tetrakis(tetrafluorophenyl)borate, tetra(tolyl)borate, tetra (xylyl)borate,(triphenyl, pentafluorophenyl)borate, [tris(pentafluorophenyl),phenyl]borate, tridecahydride-7,8-dicarbaundecaborate and the like. Also, the cation may include a carbonium cation, an oxonium cation, an ammonium cation, a phosphonium cation, a cycloheptatrienyl cation, a ferrocenium cation including transition metal, and the like. Specific examples of the carbonium cation may include trisubstituted carbonium cations such as a triphenyl carbonium cation, a tri(substituted phenyl)carbonium cation and the like. Specific examples of the tri(substituted phenyl) carbonium cation may include a tri(methylphenyl)carbonium cation, a tri(dimethylphenyl)carbonium cation and the like. Specific examples of the ammonium cations may include trialkyl ammonium cations such as a trimethyl ammonium cation, a triethyl ammonium cation, a tripropyl ammonium cation, a tributyl ammonium cation (e.g., tri (n-butyl) ammonium cation);N,N-dialkyl anilinium cations such as an N,N-dimethyl anilinium cation, an N-N-diethyl anilinium cation, an N,N-2,4,6-pentamethyl anilinium cation and the like; and dialkyne ammonium cations such as a diisopropyl ammonium cation, a dicyclohexyl ammonium cation and the like. Specific examples of the phosphonium cations may include triarylphosphonium cations such as a triphenylphosphonium cation, a tri(methylphenyl)phosphonium cation, a tri(dimethylphenyl)phosphonium cation and the like. Therefore, the ionic compound is preferably a combination of the non-coordinating anion and the cation each selected from the above and, in particular, N,N-dimethyl anilinium tetrakis(pentafluorophenyl)borate, triphenylcarbonium tetrakis(pentafluorophenyl)borate and the like are preferable. Also, these ionic compounds may be used alone or in combination with one or more others. Further, a molar amount of the ionic compound content of the first polymerization catalyst composition is preferably 0.1 to 10 times that of the compound (A), more preferably approximately 1 time.

Aluminoxane represented by (B-2) described above is a compound obtained by bringing an organoaluminum compound and a condensing agent into contact with each other and may include, for example, chain aluminoxane or cyclic aluminoxane having a repeating unit expressed by a general formula: (—Al(R')O—) (provided that the R' represents a hydrocarbon group having 1 to 10 carbon atoms, some of which may be substituted with a halogen atom and/or an alkoxy group, and a degree of polymerization of the repeating unit is preferably at least 5, more preferably at least 10). Here, specific examples of the R' may include a methyl group, an ethyl group, a propyl group, an isobutyl group and the like, among which the methyl group is preferable. Also, the organoaluminum compound used as a raw material of aluminoxane may be, for example, trialkyl aluminum such as trimethyl aluminum, triethyl aluminum, and tri-isobutyl aluminum, and a mixture thereof, among which trimethyl aluminum is particularly preferable. For example, aluminoxane using a mixture of trimethyl aluminum and tri-butyl aluminum as the raw material may be preferably used. Note that the aluminoxane content of the first polymerization catalyst composition described above is preferably adjusted such that an element ratio Al/M of the rare earth element M forming the component (A) to the aluminum element Al of the aluminoxane satisfies approximately 10 to 1000.

The halogen compound expressed by the formula (B-3) as described above is composed of at least one of Lewis acids and an organic compound containing a complex compound of metal halide and the Lewis base and active halogen and may react with the rare earth element compound or the reaction product of the rare earth element compound and the Lewis base serving as the above component (A), thereby generating a cationic transition metal compound, a halogenated transition metal compound, and a compound having insufficient electric charge at a center of the transition metal. Note that a molar amount of the total halogen compound content of the first polymerization catalyst composition described above is preferably 1 to 5 times that of the component (A).

As the Lewis acid mentioned above, in addition to a boron-containing halogenated compound such as $B(C_6F_5)_3$, an aluminum-containing halogen compound such as $Al(C_6F_5)_3$ and the like, a halogen compound containing an element of Groups III, IV, V, VI or VIII may be used. Preferably, aluminum halides and organometallic halides are mentioned. As the halogen, chlorine or bromine is preferable. Concrete examples of the Lewis acid may include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, dibutyl tin dichloride, aluminum tribromide, antimony trichloride, antimony pentachloride, phosphorus trichloride, phosphorus pentachloride, tin tetrachloride, titanium tetrachloride, tungsten hexachloride and the like. Among them, diethyl aluminum chloride, ethyl aluminum sesquichloride, ethyl aluminum dichloride, diethyl aluminum bromide, ethyl aluminum sesquibromide, and ethyl aluminum dichloride bromide are particularly preferable.

The metal halide forming the complex compound of the metal halide and the Lewis base described above may be beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide and the like. Among them, magnesium chloride, calcium chloride, barium chloride, manganese chloride, zinc chloride, and copper chloride are preferable, and magnesium chloride, manganese chloride, zinc chloride, and copper chloride are particularly preferable.

Further, as the Lewis base forming the complex compound of the metal halide and the Lewis base, a phosphorus compound, a carbonyl compound, a nitrogen compound, an ether compound, alcohols and the like are preferable. In particular, tributyl phosphate, tri-2-ethylhexyl phosphoric acid, triphenyl phosphoric acid, tricresyl phosphoric acid, triethylphosphine, tributylphosphine, triphenylphosphine, diethylphosphino ethane, diphenylphosphino ethane, acetylacetone, benzoylacetone, propionitrile acetone, valerylacetone acetone, ethyl acetylacetone, methyl acetoacetate, ethyl acetoacetate, phenyl acetoacetate, malonate dimethyl, malonate diethyl, malonate diphenyl, acetic acid, octanoic acid, 2-ethylhexanoic acid, oleic acid, stearic acid, benzoic acid, naphthenic acid, versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol and the like may be mentioned. Among them, tri-2-ethylhexyl phosphoric acid, tricresyl phosphoric acid, acetylacetone, 2-ethylhexane acid, versatic acid, 2-ethylhexyl alcohol, 1-decanol, and lauryl alcohol are preferable.

The Lewis base mentioned above is brought to reaction at a ratio of 0.01 to 30 mol, preferably 0.5 to 10 mol per mole of the metal halide mentioned above. A reaction product with the Lewis base at this ratio allows for a reduction in metal remaining in the polymer.

Organic compounds containing the active halogen described above may be benzyl chloride and the like.

Preferably, the component (C) used for the first polymerization catalyst composition described above is an organometallic compound expressed by the following general formula (X):

$$YR^1_a R^2_b R^3_c \qquad (X)$$

(provided that the Y represents metal selected from Groups 1, 2, 12, and 13 of the periodic table; the $R^1$ and the $R^2$ may be either identical to or different from each other and a hydrocarbon group having 1 to 10 carbon atoms or a hydrogen atom; the $R^3$ represents the hydrocarbon group having 1 to 10 carbon atoms and may be either identical to or different from the above $R^1$ and $R^2$; when the Y represents a metal selected from the Group 1 of the periodic table, the a is 1 and the b and the c are 0; when the Y represents a metal selected from the Groups 2 or 12 of the periodic table, the a and the b are 1 and the c is 0; and when the Y represents a metal selected from the Group 13 of the periodic table, the a, b, and c are all 1), and an organoaluminum composition expressed by the following general formula (Xa):

$$AlR^1R^2R^3 \qquad (Xa)$$

(provided that the $R^1$ and the $R^2$ are either identical to or different from each other and represent a hydrocarbon group having 1 to 10 carbon atoms or the hydrogen atom; and the $R^3$ represents the hydrocarbon group having 1 to 10 carbon atoms and may be either identical to or different from the above $R^1$ and $R^2$). The organoaluminum composition expressed by the general formula (Xa) may be trimethylaluminum, triethylaluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum; diethyl aluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, di-iso-octyl aluminum hydride; ethyl aluminum dihydride, n-propyl aluminum dihydride, isobutyl aluminum dihydride and the like. Among them, triethyl aluminum, triisobutyl aluminum, diethyl aluminum hydride, and diisobutyl aluminum hydride are preferable. The organioaluminum compounds described above serving as the component (C) may be used alone or in combination with one or more others. A molar amount of the component (C) content of the first polymerization catalyst composition described above is preferably 1 to 50 times that of the component (A), more preferably 10 times.

The addition of the additive D that may be the anionic ligand is preferable for its effect of allowing for the synthesis of synthetic isoprene with higher cis-1,4 content in high yield.

The additive D is not particularly limited as long as it may be replaced with the amide group of component (A) but preferably has any one of an OH group, an NH group, and an SH group.

Specific examples of the compounds having the OH group may include aliphatic alcohol, aromatic alcohol and the like. In particular, 2-ethyl-1-hexanol, dibutyl hydroxytoluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol),2,6-di-t-4-ethylphenol, 1,1,3-tris-(2-methyl-4-hydroxy-5-t-butylphenyl)butane, n-octadecyl-3-(4-hydroxy-3,5-di-t-butylphenyl)propionate, tetrakis [methylene-3-(3,5-di-t-butyl-4-hydroxyphenyl)propionate] ethane, dilaurylthio dipropionate, distearylthio dipropionate, and dimillistyryl thiopropionate may be mentioned but not limited thereto. A hindered phenol-based compound may include, for example, triethylene glycol-bis [3-(3-t-butyl-5-methyl-4-hydroxyphenyl)propionate], 1,6-hexanediol-bis [3-(3,5-di-t-butyl-4-hydroxyphenyl)propionate], 2,4-bis-(n-octylthio)-6-(4-hydroxy-3,5-di-t-butyl anilino)-1,3,5-triazine, pentaerythril-tetrakis[3-(3,5-di-t-butyl-4-hydroxyphenyl)propionate], 2,2-thio-diethylene-bis [3-(3,5-di-t-butyl-4-hydroxyphenyl)propionate], octadecyl-3-(3,5-di-t-butyl-4-hydroxyphenyl)propionate, N, N'-hexamethylene bis (3,5-di-t-butyl-4-hydroxy-hydrocinnamamide),3,5-t-butyl-4-hydroxybenzyl phosphonate-diethylester, 1,3,5-trimethyl-2,4,6-tris (3,5-di-t-butyl-4-hydroxybenzyl)benzene, tris-(3,5-di-t-butyl-4-hydroxybenzyl)-isocyanurate, octyl diphenylamine, and 2,4-bis [(octylthio)methyl]o-cresol.

Further, a hydrazine compound may be N,N'-bis [3-(3,5-di-t-butyl-4-hydroxyphenyl)propionyl]hydrazine.

The compounds having the NH group may be primary amines such as alkyl amine, aryl amine and the like, or secondary amines. In particular, dimethylamine, diethylamine, pyrrole, ethanolamine, diethanolamine, dicyclohexylamine, N,N'-dibenzylethylenediamine, and bis(2-diphenylphosphino phenyl)amine may be mentioned.

The compounds having the SH group may be, in addition to aliphatic thiol, aromatic thiol and the like, those expressed by the following general formulas (I) and (II).

[Chemical formula 1]

(I)

(Provided that each $R^1$, $R^2$, and $R^3$ are independently represented by $-O-C_jH_{2j+1}$, $-(O-C_kH_{2k}-)_a-O-C_mH_{2m+1}$, and $-C_nH_{2n+1}$; at least one of $R^1$, $R^2$, and $R^3$ is represented by $-(O-C_kH_{2k}-)_a-O-C_mH_{2m+1}$; each of j, m, and n is independently between 0 and 12; each k and a is independently between 1 and 12; and $R^4$ is a C1-12 linear, branched or cyclic, saturated or unsaturated, alkylene group, cycloalkylene group, cycloalkylalkylene group, cycloalkenyl alkylene group, alkenylene group, cycloalkenylene group, cycloalkyl alkenylene group, cycloalkenyl alkenylene group, arylene group, or aralkylene group.)

Specific examples of those represented by the general formula (I) may include 3-mercaptopropyltrimethoxysilane, 3-mercaptopropyltriethoxysilane, 3-mercaptopropylmethyldimethoxysilane, (mercaptomethyl)dimethylethoxysilane, (mercaptomethyl) dimethylethoxysilane, and mercaptomethyl trimethoxysilane.

[Chemical formula 2]

(II)

(Provided that W is represented by $-NR^8-$, $-O-$, or $-CR^9R^{10}-$(here, $R^8$ and $R^9$ are $C_pH_{2p+1}$, $R^{10}$ is $-C_q$ $H2_{q+1}$, and each p and q is between 0 and 20); each $R^5$ and $R^6$ is independently represented by -M-$C_r$ $H_{2r}$— (here, M is —O— or —$CH_2$—, and r is between 1 and 20); $R^7$ is represented by —O—$C_jH_{2j+1}$, —(O—$C_kH_{2k}$—)$_a$—O—$C_mH_{2m+1}$, or —$C_nH_{2n+1}$; each j, m and n is between 0 and 12; each k and a is between 1 and 12; and $R^4$ is the C1-12 linear, branched or cyclic, saturated or unsaturated, alkylene group, cycloalkylene group, cycloalkylalkylene group, cycloalkenyl alkylene group, alkenylene group, cycloalkenylene group, cycloalkyl alkenylene group, cycloalkenyl alkenylene group, arylene group, or aralkylene group.)

Specific examples of those represented by the general formula (II) may include 3-mercaptopropyl(ethoxy)-1,3-dioxa-6-methylaza-2-silacyclooctane, 3-mercaptopropyl(ethoxy)-1,3-dioxa-6-buthylaza-2-silacyclooctane, and 3-mercaptopropyl(ethoxy)-1,3-dioxa-6-dodecylaza-2-silacyclooctane.

As the additive (D), an anionic tridentate ligand precursor expressed by the following general formula (ii) may be preferably used:

$$E^1\text{-}T^1\text{-}X\text{-}T^2E^2 \quad (ii)$$

(provided that the X represents an anionic electron donor group including a coordinating atom selected from Group 15 atoms; each $E^1$ and $E^2$ independently represents a neutral electron donor group including a coordinating atom selected from Group 16 atoms and Group 15 atoms; and the $T^1$ and the $T^2$ represent a crosslinking group for crosslinking the X and the $E^1$ and a crosslinking group for crosslinking the X and the $^-E^2$, respectively).

Relative to 1 mol of the rare earth element compound, 0.01 to 10 mol of the additive (D) is preferably added, particularly preferably 0.1 to 1.2 mol. When the adding amount is less than 0.1 mol, the polymerization of the monomer may not sufficiently proceed, making it difficult to achieve the object of the present invention.

Although the adding amount preferably corresponds to the adding amount of the rare earth element compound (1.0 mol), the adding amount may be more. However, the adding amount greater than 1.2 mol causes loss of a reagent and is not preferable.

In the above general formula (ii), the electron donating groups $E^1$ and $E^2$ include a coordination atom selected from Group 16 and Group 15. Also, $E^1$ and $^-E^2$ may be either the same group or different groups. The coordinating atom may be, for example, nitrogen N, phosphorus P, oxygen O, or sulfur S, and preferably P.

When the coordination atom contained in $E^1$ and $E^2$ is P, the neutral electron donating group $E^1$ or $E^2$ may be, for example, 1) a diarylphosphino group such as a diphenylphosphino group and a ditolylphosphino group, 2) dialkylphsphino group such as a dimethylphosphino group and a diethylphosphino group, or 3) alkylarylphosphino group such as methyl phenyl phosphino group, and more preferably the diarylphosphino group.

When the coordination atom included in $E^1$ and $E^2$ is N, the neutral electron donating group $E^1$ or $E^2$ may be, for example, 1) a dialkylamino group such as a dimethylamino group, a diethylamino group, and a bis (trimethylsilyl) amino group, 2) a diarylamino group such as a diphenylamino group, or 3) an alkylaryl amino group such as a methylphenyl group.

When the coordination atom included in $E^1$ and $E^2$ is O, the neutral electron donating group $E^1$ or $E^2$ may be, for example, 1) an alkoxy group such as a methoxy group, an ethoxy group, a propoxy group, and a butoxy group, or 2) an aryloxy group such as a phenoxy group and 2,6-dimethyl phenoxy group.

When the coordination atom included in $E^1$ and $E^2$ is S, the neutral electron donating group $E^1$ or $E^2$ may be, for example, 1) an alkylthio group such as a methylthio group, an ethylthio group, a propylthio group, and a butylthio group, or 2) an arylthio group such as a phenylthio group and a tolylthio group.

The anionic electron donating group X is a group including a coordination atom selected from Group 15. As the coordination atom, phosphorus P and nitrogen N are preferable, and N is more preferable.

The crosslinking group $T^1$ and $T^2$ are required only to crosslink X and $E^1$, and X and $E^2$ and may be, for example, an arylene group which may have a substituent group on an aryl ring. Also, $T^1$ and $T^2$ may be either the same group or different groups.

The arylene group may be a phenylene group, a naphthylene group, a pyridilene group, and a thienylene group (preferably, the phenylene group or the naphthylene group). Further, any group may be substituted on the aryl ring of the arylene group. Examples of the sub stituent group may include an alkyl group such as the methyl group and the ethyl group, an aryl group such as a phenyl group and a tolyl group, a halogen group such as fluoro, chloro, and bromo, and a silyl group such as trimethylsilyl group.

More preferably, the arylene group is a 1,2-phenylene group, for example.

The anionic tridentate ligand precursor of a metal complex forming the polymerization catalyst may be produced with reference to, for example, Organometallics, 23, p 4778-4787 (2004). In particular, a bis (2-diphenylphosphinophenyl)amine (PNP) ligand may be mentioned.

—Second Polymerization Catalyst Composition—

Next, a secondary polymerization catalyst composition (hereinafter, also referred to as a "second polymerization catalyst composition") will be described. The second polymerization catalyst composition may be a polymerization catalyst composition including at least one complex selected from a group including a metallocene complex expressed by the following general formula (III):

[Chemical formula 3]

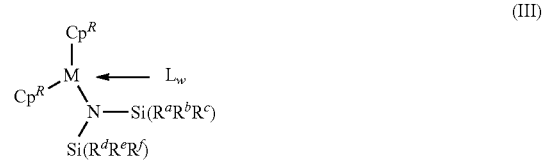

(III)

(provided that the M represents a lanthanide element, scandium, or yttrium; each of the $Cp^R$ independently represents substituted or unsubstituted indenyl; each $R^a$ to $R^f$ independently represents an alkyl base having 1 to 3 carbon atoms or a hydrogen atom; the L represents a neutral Lewis base; and the w represents an integer of 0 to 3), a metallocene complex expressed by the following general formula (IV):

[Chemical formula 4]

(IV)

(provided that the M represents a lanthanide element, scandium, or yttrium; each of the $Cp^r$ independently represents substituted or unsubstituted indenyl; the X' represents a hydrogen atom, a halogen atom, the alkoxide group, the thiolate group, an amide group, a silyl group, or a hydrocarbon group having 1 to 20 carbon atoms; the L represents the neutral Lewis base; and the w represents an integer of 0 to 3), and a metallocene complex expressed by the following general formula (V):

[Chemical formula 5]

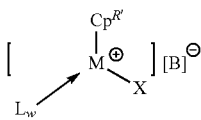

(V)

(provided that the M represents a lanthanide element, scandium, or yttrium; the $Cp^{R'}$ represents substituted or unsubstituted cyclopentadienyl, indenyl, or fluorenyl; the X represents a hydrogen atom, a halogen atom, the alkoxide group, the thiolate group, an amide group, a silyl group, or the hydrocarbon group having 1 to 20 carbon atoms; the L represents the neutral Lewis base; the w represents an integer of 0 to 3; and the [B]$^-$ represents the non-coordinating anion).

The second polymerization catalyst composition may further include another component contained in a normal polymerization catalyst composition containing the metallocene complex such as, for example, the co-catalyst. Here, the metallocene complex is a complex compound having one or more cyclopentadienyl or its derivatives bound to a central metal. A metallocene complex having cyclopentadienyl or its one derivative bound to the central metal may be particularly referred to as a half-metallocene complex.

Note that in the polymerization reaction system the concentration of the complex contained in the second polymerization catalyst composition is preferably within the range of 0.1 to 0.0001 mol/L.

In metallocene complexes represented by the general formulae (III) and (IV) set forth above, the $Cp^R$ represents unsubstituted indenyl or substituted indenyl. $Cp^R$ having an indenyl ring as a basic framework is expressed by $C_9H_{7-X}R_X$ or $C_9H_{11-X}R_X$. Here, the X represents an integer of 0 to 7 or 0 to 11. Also, each of the R indenpendently represents a hydrocarbyl group or a metalloid group. The hydrocarbyl group preferably has 1 to 20 carbon atoms, more preferably 1 to 10 carbon atoms, further preferably 1 to 8 carbon atoms. The hydrocarbyl group may include, in particular, the methyl group, the ethyl group, the phenyl group, a benzyl group and the like. On the other hand, metalloid of the metalloid group may include, for example, germyl Ge, stannyl Sn, and silyl Si. The metalloid group preferably includes the hydrocarbyl group, which is similar to the hydrocarbyl group described above. The methalloid group may include, in particular, a trimethyl silyl group and the like. The substituted indenyl may include, in particular, 2-phenyl indenyl, 2-methyl indenyl and the like. Note that the $Cp^R$ in the two general formulae (III) and (IV) may be identical to or different from each other.

In the half-metallocene complex represented by the general formula (V) set forth above, the $Cp^{R'}$ represents unsubstituted or substituted cyclopentadienyl, indenyl or fluorenyl. Among them, unsubstituted or substituted indenyl is preferable. $Cp^{R'}$ having a cyclopentadienyl ring as a basic framework is expressed by $C_5H_{5-X}R_X$. Here, the X represents an integer of 0 to 5. Also, each of the R preferably represents the hydrocarbyl group or the methalloid group. The hydrocarbyl group preferably has 1 to 20 carbon atoms, more preferably 1 to 10 carbon atoms, further preferably 1 to 8 carbon atoms. Preferably, the hydrocarbyl group may be, in particular, the methyl group, the ethyl group, the phenyl group, the benzyl group and the like. On the other hand, metalloid of the metalloid group may include germyl Ge, stannyl Sn, and silyl Si. The methalloid group preferably includes the hydrocarbyl group, which is similar to the hydrocarbyl group described above. The methalloid group may include, in particular, the trimethyl silyl group and the like. In particular, the $Cp^{R'}$ having the cyclopentadienyl ring as the basic framework may be as follows:

[Chemical formula 6]

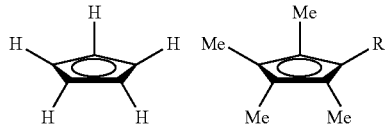

(provided that the R represents a hydrogen atom, a nethyl base, or an ethyl base).

In the general formula (V), the $Cp^{R'}$ having the indenyl ring described above as the basic framework is defined in a manner similar to the $Cp^R$ in the general formula (III), and preferable example thereof is also similar to the $Cp^R$.

In the general formula (V), the $Cp^{R'}$ having the cyclopentadienyl ring as the basic framework is expressed by $C_{13}H_{9-X}R_X$ or $C_{13}H_{17-X}R_X$. Here, the X represents an integer of 0 to 9 or 0 to 17. Also, each of the R preferably represents the hydrocarbyl group or the methalloid group. The hydrocarbyl group preferably has 1 to 20 carbon atoms, more preferably 1 to 10 carbon atoms, further preferably 1 to 8 carbon atoms. In particular, the hydrocarbyl group is preferably the methyl group, the ethyl group, the phenyl group, the benzyl group and the like. On the other hand, metalloid of the metalloid group may include, for example, germyl Ge, stannyl Sn, and silyl Si. The metalloid group preferably includes the hydrocarbyl group, which is similar to the hydrocarbyl group described above. The methalloid group includes, in particular, the trimethyl silyl group and the like.

The central metal M in the general formula (III), the formula (IV), and the formula (V) is a lanthanide element, scandium, or yttrium. Lanthanoide includes fifteen elements with atomic numbers 57 to 71, and the lanthanoide element may be any one of them. Preferably, the central metal M is samarium Sm, neodymium Nd, praseodymium Pr, gadolinium Gd, cerium Ce, holmium Ho, scandium Sc, or yttrium Y.

The metallocene complex expressed by the general formula (III) includes a silylamides ligand [—N(SiR$_3$)$_2$]. Each of the R groups (the R$^a$ to the R$^f$ in the general formula (III)) in the silylamide ligand independently represents a hydrogen atom or an alkyl group having 1 to 3 carbon atoms. Preferably, at least one of the R$^a$ to the R$^f$ is a hydrogen atom, whereby synthesis of the catalyst is facilitated and, since bulk around silicon becomes lower, nonconjugated olefin may be easily introduced. From a similar viewpoint, it is further preferable that at least one of the R$^a$ to the R$^c$ is a hydrogen atom, and at least one of the R$^d$ to the R$^f$ is a hydrogen atom. Further, the alkyl group is preferably the methyl group.

The metallocene complex expressed by the general formula (IV) includes a silyl ligand [—SiX'$_3$]. The X' in the silyl ligand [—SiX'$_3$] is a group defined similarly to the X in the general formula (V) described below and having similar preferable groups.

In the general formula (V), the X is a group selected from a hydrogen atom, a halogen atom, the alkoxide group, the thiolate group, the amide group, the silyl group, or the hydrocarbon group having 1 to 20 carbon atoms. Here, the alkoxide group includes aliphatic alkoxy groups such as a methoxy group, an ethoxy group, a propoxy group, an n-butoxy group, an isobutoxy group, a sec-butoxy group, a tert-butoxy group; and aryloxide groups such as a phenoxy group, a 2,6-di-tert-butyl phenoxy group, a 2,6-diisopropylphenoxy group, a 2,6-dineopentyl phenoxy group, a 2-tert-butyl-6-isopropyl phenoxy group, a 2-tert-butyl-6-neopentyl phenoxy group, a 2-isopropyl-6-neopentyl phenoxy group and the like. Among them, the 2,6-di-tert-butyl phenoxy group is preferable.

In the general formula (V), the thiolate group represented by the X may include fatty thiolate groups such as a thiomethoxy group, a thioethoxy group, a thiopropoxy group, a thio-n-butoxy group, a thioisobutoxy group, a thio-sec-butoxy group, a thio-tert-butoxy group and the like; and arylthiolate groups such as a thiophenoxy group, a 2,6-di-tert-butyl thiophenoxy group, a 2,6-diisopropyl thiophenoxy group, a 2,6-dineopentyl thiophenoxy group, a 2-tert-butyl-6-isopropyl thiophenoxy group, a 2-tert-butyl-6-thioneophentyl phenoxy group, a 2-isopropyl-6-thineopentyl phenoxy group, a 2,4,6-triisopropyl thiophenoxy group and the like. Among them, the 2,4,6-triisopropyl thiophenoxy group is preferable.

In the general formula (IV), the amide group represented by the X may include aliphatic amide groups such as a dimethylamide group, a diethylamide group, a diisopropylamide group and the like; arylamide groups such as a phenylamide group, a 2,6-di-tert-butylphenyl amide group, a 2,6-dineopentyl phenylamide group, a 2-tert-butyl-6-isopropyl phenylamido group, a 2-tert-butyl-6-neopentyl phenylamide group, a 2-isopropyl-6-neophentyl phenylamide group, a 2,4,-tri-tert-butylphenylamide group and the like; and bistrialkylsilyl amide groups such as a bistrimethylsilyl amide group and the like. Among them, the bistrimethylsilyl amide group is preferable.

In the general formula (V), the siryl groups represented by the X includes a trimethylsilyl group, a tris(trimethylsilyl) silyl group, a bis(trimethylsilyl)methylsilyl group, a trimethylsilyl(dimethyl)silyl group, a triisopropylsilyl(bistrimethylsilyl)silyl group and the like. Among them, the tris (trimethylsilyl)silyl group is preferable.

In the general formula (V), the halogen atom represented by the X may be any one of a fluorine atom, a chlorine atom, a bromine atom, and an iodine atom. Among then, the chlorine atom and the bromine atom are preferable. Further, the hydrocarbon group having 1 to 20 carbon atoms represented by the X includes, in particular, normal-chain type or branched-chain type aliphatic hydrocarbon groups such as the methyl group, the ethyl group, an n-propyl group, an isopropyl group, an n-butyl group, an isobutyl group, a sec-butyl group, a tert-butyl group, a neopentyl group, a hexyl group, an octyl group and the like; aromatic hydrocarbon groups such as a phenyl group, a tryl group, a naphtyl group and the like; aralkyl groups such as a benzyl group and the like; and hydrocarbon groups containing silicon atoms such as a trimethylsilylmethyl group, a bistrimethylsilylmethyl group and the like. Among them, the methyl group, the ethyl group, the isobutyl group, and the trimethylsilylmethyl group are preferable.

In the general formula (V), the X preferably represents a bistrimethylsilyl amide group or the hydrocarbon group having 1 to 20 carbon atoms.

In the general formula (V), the non-coordinating anion represented by the [B]$^-$ may be, for example, a tetravalent boron anion. The tetravalent boron anion may include, in particular, tetraphenylborate, tetrakis(monofluorophenyl) borate, tetrakis(difluorophenyl)borate, tetrakis(trifluoromethyl)borate, tetrakis(tetrafluorophenyl)borate, tetrakis(pentafluorophenyl)borate, tetrakis(tetrafluoromethylphenyl) borate, tetra(tolyl)borate, tetra(xylyl)borate,(triphenyl, pentafluorophenyl)borate, [tris(pentafluorophenyl),phenyl] borate, tridecahydride-7,8-dicarbaundecaborate and the like. Among them, tetrakis (pentafluorophenyl) borate is preferable.

The metallocene complexes expressed by the general formulae (III) and (IV) set forth above and the half-metallocene cation complex represented by the general formula (V) set forth above further include zero to three neutral Lewis base L, preferably zero to one. Here, the neutral Lewis base L may include, for example, tetrahydrofuran, diethyl ether, dimethyl aniline, trimethyl phosphine, lithium chloride, neutral olefins, neutral diolefins and the like. When the complex described above includes a plurality of neutral Lewis bases L, those neutral Lewis bases L may be either identical to or different from one another.

The metallocene complexes expressed by the general formulae (III) and (IV) set forth above and the half-metallocene cation complex represented by the general formula (V) set forth above may be present as a monomer, a dimer, or a multimer.

The metallocene complex expressed by the general formula (III) set forth above may be obtained by, for example, reacting lanthanoid trishalide, scandium trishalide, or yttrium trishalide with salt of indenyl (for example, potassium salt or lithium salt) and salt of bis (trialkylsilyl) amide (for example, potassium salt or lithium salt) in a solvent. Note that, since the reaction temperature may be room temperature, the metallocene complex may be prepared under mild conditions. The reaction time may be any time between several hours to several tens of hours. The reaction solvent is not particularly limited but preferably a solvent that dissolves the original materials and produced materials. As the reaction solvent, toluene may be used, for example. The following is an example of the reaction for obtaining the metallocene complex expressed by the general formula (III).

[Chemical formula 7]

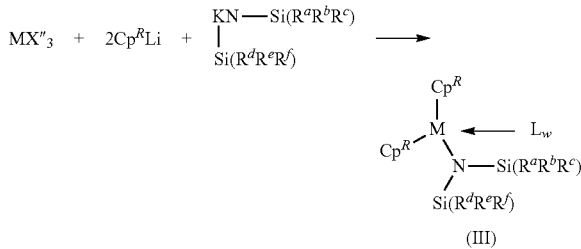

(Provided that the X" represents halide.)

The metallocene complex expressed by the general formula (IV) set forth above may be obtained by, for example, reacting lanthanoid trishalide, scandium trishalide, or yttrium trishalide with salt of indenyl (for example, potassium salt or lithium salt) and salt of silyl (for example, potassium salt or lithium salt) in a solvent. Note that, since the reaction temperature may be room temperature, the metallocene complex may be prepared under mild conditions. The reaction time may be any time between several hours to several tens of hours. The reaction solvent is not particularly limited but preferably a solvent that dissolves the original materials and produced materials. As the reaction solvent, toluene may be used, for example. The following is an example of the reaction for obtaining the metallocene complex expressed by the general formula (IV).

[Chemical formula 8]

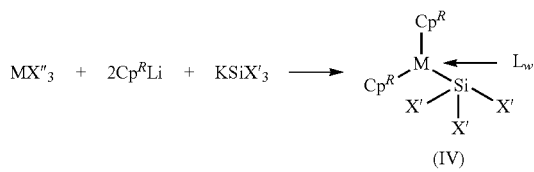

(IV)

(Provided that X" represents halide.)

The half-metallocene cation complex expressed by the general formula (V) set forth above may be obtained from the following reaction:

[Chemical formula 9]

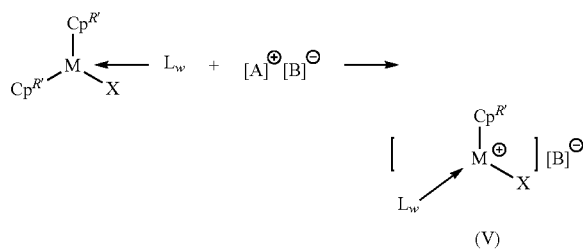

(V)

Here, in a compound expressed by the general formula (VI), the M represents a lanthanide element, scandium, or yttrium. Each of the $Cp^{R'}$ independently represents unsubstituted or substituted cyclopentadienyl, indenyl, or fluorenyl; the X represents a hydrogen atom, a halogen atom, the alkoxide group, the thiolate group, the amide group, the silyl group, or the hydrocarbon group having 1 to 20 carbon atoms; the L represents the neutral Lewis base; and the w represents an integer of 0 to 3. Also, in the ionic compound expressed by the general formula $[A]^+[B]^-$, the $[A]^+$ represents the cation, and the $[B]^-$ represents the non-coordinating anion.

A cation represented by the $[A]^+$ includes, for example, the carbonium cation, the oxonium cation, the amine cation, the phosphonium cation, the cycloheptatrienyl cation, the ferrocenium cation having transition metal and the like. The carbonium cation may include, for example, trisubstituted carbonium cations such as the triphenyl carbonium cation, the tri(substituted phenyl)carbonium cation and the like. The tri(substituted phenyl)carbonyl cations may include, in particular, the tri(methylphenyl)carbonium cation and the like. The amine cation may include trialkylammonium cations such as the trimethyl ammonium cation, the triethyl ammonium cation, the tripropyl ammonium cation, the tributyl ammonium cation and the like; N,N-dialkyl anilinium cations such as the N,N-dimethyl anilinium cation, an N,N-diethyl anilinium cation, an N,N-2,4,6-penthametyl anilinium cation and the like; and dialkyl ammonium cations such as the diisopropyl ammonium cation, a dicyclehexane ammonium cation and the like. The phosphonium cations may include the triarylphosphonium cations such as the triphenylphosphonium cation, the tri(methylphenyl)phosphonium cation, the tri (dimethylphenyl) phosphonium cation and the like. Among these cations, the N,N-dialkyl anilinium cation and the carbonium cation are preferable, and the N,N-dialkyl anilinium cation is particularly preferable.

The ionic compound represented by the general formula $[A]^+[B]^-$ used for the reaction described above is a compound in combination of the non-coordinating anion and the cation respectively selected from those mentioned above, and N,N-dimethylanilinium tetrakis(pentafluorophenyl)borate and triphenyl carbonium tetrakis(pentafluorophenyl) borate are preferable. Also, the ionic compound represented by the general formula $[A]^+[B]^-$ is preferably added in a molar amount of 0.1 to 10 times that of the metallocene complex, more preferably 1 time. Note that, in using the half-metallocene cation complex expressed by the general formula (V) for the polymerization reaction, the half-metallocene cation complex expressed by the general formula (V) may be provided to the polymerization reaction system as it stands, or the compound represented by the general formula (IV) used for the reaction described above and the ionic compound expressed by the general formula $[A]^+[B]^-$ may be separately provided to the polymerization reaction system, and the half-metallocene cation complex expressed by the general formula (V) may be formed in the reaction system. Also, when a combination of the metallocene cation complex expressed by the general formula (III) or (IV) and the ionic compound expressed by the general formula $[A]^+$ $[B]^-$ is used, the half-metallocene cation complex expressed by the general formula (V) may be formed in the reaction system.

Structures of the metallocene complex expressed by the general formulae (III) and (IV) and the half-metallocene cation complex expressed by the general formula (V) set forth above are preferably determined by conducting X-ray structural analysis.

The co-catalyst that may be used for the second polymerization catalyst composition described above may be any component selected from those usually used as the co-catalyst of the normal polymerization catalyst composition including the metallocene complex. The co-catalyst may preferably be, for example, aluminoxane, the organoaluminum compound, the ionic compound described above. Those co-catalysts may be used alone or in combination with two or more others.

Preferably, aluminoxane described above is alkyl amino hexane and, for example, methylaluminoxane (MAO), modified methylaluminoxane and the like may be mentioned. Preferably, the modified methylaluminoxane is MMAO-3A (produced by Tosoh Finechem Corporation) and the like. Note that the aluminoxane content of the second polymerization catalyst composition described above is preferably adjusted such that the element ratio Al/M of the central metal M of the metallocene complex to the aluminum element Al of aluminoxane is within an approximate range of 10 to 1000, preferably approximately 100.

On the other hand, the organoaluminum compound described above is preferably one expressed by a general formula AlRR'R" (provided that each R and R' independently represents a hydrocarbon group of C1 to C10 or a hydrogen atom, and the R" represents the hydrocarbon group of C1 to C10). The organoaluminum compound may include, for example, trialkyl aluminum, dialkyl aluminum chloride, alkyl aluminum dichloride, dialkyl aluminum hydride and the like. Among them, trialkyl aluminum is preferable. Also, trialkyl aluminum may include, for example, triethyl aluminum, triisobutyl aluminum and the like. A molar amount of the organoaluminum compound contained in the polymerization catalyst composition described above is preferably 1 to 50 times that of themetallocene complex, more preferably 10 times.

Further, in the polymerization catalyst composition described above, each of the metallocene complexes expressed by the above general formulae (III) and (IV) and the half metallocene cation complex expressed by the above general formula (V) are combined together with an appropriate co-catalyst. Thereby, the cis-1,4 bond and molecular weight of the resulting polymer may be increased.

—Third Polymerization Catalyst Composition—

Next, a tertiary polymerization catalyst composition (hereinafter, also referred to as a "third polymerization catalyst composition") will be described.

The third polymerization catalyst composition may be a metallocene-based complex catalyst serving as the rare earth element compound expressed by the following formula (A):

  (A)

(provided that the R represents unsubstituted or substituted indenyl and is coordinated to M; the M represents a lanthanoid element, scandium, or yttrium; the X represents the hydrocarbon group having 1 to 20 carbon atoms and is μ-coordinated to the M and the Q; the Q represents a Group 13 element of the Periodic Table; the Y represents the hydrocarbon group having 1 to 20 carbon atoms or a hydrogen atom and is coordinated to the Q; and the a and the b are 2).

A preferable example of the metallocene-based complex catalyst described above may be expressed by the following formula (XV):

[Chemical formula 10]

  (XV)

(provided that the $M^1$ represents a lanthanoid element, scandium, or yttrium; each of the $Cp^R$ independently represents unsubstituted or substituted indenyl; each $R^A$ and $R^B$ represents the hydrocarbon group having 1 to 20 carbon atoms; both $R^A$ and $R^B$ are μ-coordinated to the $M^1$ and the Al; and the $R^c$ and the $R^D$ independently represent the hydrocarbon group having 1 to 20 carbon atoms or a hydrogen atom).

The use of the metallocene-based complex catalyst described above allows for the production of the polymer. Also, the metallocene-based complex catalyst such as, for example, a catalyst preliminarily compounded with an aluminum catalyst allows for the reduction in an amount of alkylaluminium used for the polymer synthesis to some degrees, or elimination thereof. Note that the use of a conventional catalyst system requires to use a great amount of alkylaluminium for the polymer synthesis. For example, the conventional catalyst system requires to use alkylaluminium of at least 10 equivalents with respect to a metal catalyst, while the metallocene-based complex catalyst described above may exhibit an excellent catalytic effect when alkylaluminium of approximately 5 equivalents is added.

In the metallocene-based complex catalyst described above, the metal M in the above formula (A) is a lanthanoid element, scandium, or yttrium. Lanthanoid includes fifteen elements with atomic numbers 57 to 71, and the lanthanoide element may be any one of them. Preferably, the central metal M is samarium Sm, neodymium Nd, praseodymium Pr, gadolinium Gd, cerium Ce, holmium Ho, scandium Sc, or yttrium Y.

In the above formula (A), the R represents unsubstituted or substituted indenyl, and is coordinated to the metal M. Specific examples of substituted indenyl group may include, for example, a 1,2,3-rimethylindenyl group, a heptamethyl indenyl group, a 1,2,4,5,6,7-hexamethyl indenyl group and the like.

In the above formula (A), the Q represents the Group 13 element in the periodic table and may be, in particular, boron, aluminum, gallium, indium, thallium and the like.

In the above formula (A), the X represents the hydrocarbon group having 1 to 20 carbon atoms and is μ-coordinated to the M and the Q. Here, the hydrocarbon group having 1 to 20 carbon atoms may include the methyl group, the ethyl group, the propyl group, a butyl group, a pentyl group, the hexyl group, a heptyl group, the octyl group, a decyl group, a dodecyl group, a tridecyl group, a tetradecyl group, a pentadecyl group, a hexadecyl group, a heptadecyl group, a stearyl group and the like. Note that the μ-coordination refers to a coordination mode taking a crosslinked structure.

In the above formula (A), the Y represents the hydrocarbon group having 1 to 20 carbon atoms or a hydrogen atom and is coordinated to the Q. Here, the hydrocarbon group having 1 to 20 carbon atoms may include the methyl group, the ethyl group, the propyl group, the butyl group, the pentyl group, the hexyl group, the heptyl group, the octyl group, the decyl group, the dodecyl group, the tridecyl group, the tetradecyl group, the pentadecyl group, the hexadecyl group, the heptadecyl group, the stearyl group and the like.

In the above formula (XV), the metal $M^1$ is a lanthanoid element, scandium, or yttrium. Lanthanoid includes fifteen elements with atomic numbers 57 to 71, and the lanthanoide element may be any one of them. Preferably, the metal $M^1$ is samarium Sm, neodymium Nd, praseodymium Pr, gadolinium Gd, cerium Ce, holmium Ho, scandium Sc, or yttrium Y.

In the above formula (XV), the $Cp^R$ represents unsubstituted indenyl or substituted indenyl. The $Cp^R$ having the indenyl ring as the basic framework is expressed by $C_9H_{7-X}R_X$ or $C_9H_{11-X}R_X$. Here, the X represents an integer of 0 to 7 or 0 to 11. Preferably, each of the R independently represents the hydrocarbyl group or the metalloid group. The hydrocarbyl group preferably has 1 to 20 carbon atoms, more preferably 1 to 10 carbon atoms, further preferably 1 to 8 carbon atoms. The hydrocarbyl group may include, in particular, the methyl group, the ethyl group, phenyl group, benzyl group and the like. On the other hand, metalloid of the metalloid group may include, for example, germyl Ge, stannyl Sn, and silyl Si. The methalloid group preferably includes the hydrocarbyl group, which is similar to the hydrocarbyl group described above. The methalloid group includes, in particular, the trimethyl silyl group and the like.

The substituted indenyl includes, in particular, 2-phenyl indenyl, 2-methyl indenyl and the like. Note that the two $Cp^R$ in the formula (XV) may be identical to or different from each other.

In the above formula (XV), each $R^A$ and $R^B$ independently represents the hydrocarbon group having 1 to 20 carbon atoms or a hydrogen atom and both $R^A$ and $R^B$ are μ-coordinated to the M' and the Al. Here, the hydrocarbon group having 1 to 20 carbon atoms may be the methyl group, the ethyl group, the propyl group, the butyl group, the pentyl group, the hexyl group, the heptyl group, the octyl group, the decyl group, the dodecyl group, the tridecyl group, the tetradecyl group, the pentadecyl group, the hexadecyl group, the heptadecyl group, the stearyl group and the like. Note that the μ-coordination refers to the coordination mode taking the crosslinked structure.

In the above formula (XV), each $R^C$ and $R^D$ independently represents the hydrocarbon group having 1 to 20 carbon atoms or a hydrogen atom. Here, the hydrocarbon group having 1 to 20 carbon atoms may be the methyl group, the ethyl group, the propyl group, the butyl group, the pentyl group, the hexyl group, the heptyl group, the octyl group, the decyl group, the dodecyl group, the tridecyl group, the tetradecyl group, the pentadecyl group, the hexadecyl group, the heptadecyl group, the stearyl group and the like.

The metallocene-based complex catalyst described above may be obtained by, for example, reacting the metallocene complex with an organoaluminum compound expressed by $AlR^KR^LR^M$ in a solvent, and the metallocene complex is expressed by the following formula (XVI):

[Chemical formula 11]

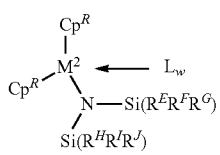

(XVI)

(provided that the $M^2$ represents a lanthanoid element, scandium, or yttrium; each of the $Cp^R$ independently represents unsubstituted or substituted indenyl; each $R^E$ and $R^J$ independently represents the alkyl group having 1 to 3 carbon atoms or a hydrogen atom; the L represents the neutral Lewis base; and the w represents an integer of 0 to 3). Note that, since the reaction temperature may be room temperature, the metallocene complex may be prepared under mild conditions. The reaction time may be any time between several hours to several tens of hours. The reaction solvent is not particularly limited but preferably a solvent that dissolves the original materials and produced materials. As the reaction solvent, toluene may be used, for example. A structure of the metallocene-based complex catalyst is preferably determined by using $^1$H-NMR or the X-ray structural analysis.

In the metallocene complex expressed by the above formula (XVI), the $Cp^R$ represents unsubstituted indenyl or substituted indenyl and is defined as the same as the $Cp^R$ in the above formula (XV). In the above formula (XVI), also, the metal $M^2$ represents a lanthanoid element, scandium, or yttrium and is defined as the same as $M^1$ in the above formula (XV).

The metallocene complex expressed by the general formula (XVI) includes a silylamides ligand [—N(SiR$_3$)$_2$]. Each of the R groups ($R^E$ to $R^J$) in the silylamide ligand is independently the alkyl group having 1 to 3 carbon atoms or a hydrogen atom. Preferably, at least one of the $R^E$ to the $R^J$ is a hydrogen atom, whereby the synthesis of the catalyst is facilitated. Further, the alkyl group is preferably the methyl group.

The metallocene complex expressed by the general formula (XVI) further includes zero to three neutral Lewis base L, more preferably zero to one. Here, the neutral Lewis base L may include, for example, tetrahydrofuran, diethyl ether, dimethyl aniline, trimethyl phosphine, lithium chloride, neutral olerines, neutral diolefins and the like. When the complex descrived above contains a plurality of neutral Lewis bases L, those neutral Lewis bases L may be either identical to or different from one another.

The metallocene complex expressed by the above formula (XVI) may be present as a monomer, a dimer, or a multimer.

On the other hand, the organoaluminum compound used for the production of the metallocene-based complex catalyst described above is represented by $AlR^KR^LR^M$. Here, each $R^K$ and $R^L$ independently represents a monovalent hydrocarbon group having 1 to 20 carbon atoms or a hydrogen atom, while the $R^M$ represents a monovalent hydrocarbon group having 1 to 20 carbon atoms. Note that the $R^M$ may be either identical to or different from the $R^K$ or the $R^L$ described above. The monovalent hydrocarbon group having 1 to 20 carbon atoms may include the methyl group, the ethyl group, the propyl group, the butyl group, the pentyl group, the hexyl group, the heptyl group, the octyl group, the decyl group, the dodecyl group, the tridecyl group, the tetradecyl group, the pentadecyl group, the hexadecyl group, the heptadecyl group, the stearyl group and the like.

The organoaluminum composition described above may include, in particular, trimethylaluminum, triethylaluminum, tri-n-propyl aluminum, tri-isopropyl aluminum, tri-n-butyl aluminum, tri-isobutyl aluminum, tri-t-butyl aluminum, tripentyl aluminum, tri-hexyl aluminum, tricyclohexyl aluminum, tri-octyl aluminum; diethyl aluminum hydride, di-n-propyl aluminum hydride, di-n-butyl aluminum hydride, diisobutyl aluminum hydride, dihexyl aluminum hydride, diisohexyl aluminum hydride, dioctyl aluminum hydride, di-iso-octyl aluminum hydride; ethyl aluminum dihydride, n-propyl aluminum dihydride, isobutyl aluminum dihydride and the like. Among them, triethyl aluminum, tri-isobutyl aluminum, diethyl aluminum hydride, and diisobutyl aluminum hydride are preferable. Also, the organioaluminum compounds described above may be used alone or in combination with one or more others. A molar amount of the organoaluminum compound used for the preparation of the metallocene-based complex catalyst described above is preferably 1 to 50 times that of metallocene complex, more preferably 10 times.

The third polymerization catalyst composition is characterized in containing the metallocene-based complex catalyst described above and a boron anion and, preferably, further contains other components contained in the normal polymerization catalyst composition including metallocene catalyst, such as the co-catalyst and the like. A combination of metallocene-based complex catalyst described above and the boron anion is also referred to as a two-component catalyst. Since the third polymerization catalyst composition described above further contains the boron anion similarly to the above metallocene-based complex catalyst, the content of each monomer component in the polymer may be controlled as desired.

In the third polymerization catalyst composition described above, the boron anion for forming the two-component catalyst may be, in particular, the tetravalent boron anion. For example, tetraphenylborate, tetrakis(monofluorophenyl)borate, tetrakis(difluorophenyl)borate, tetrakis (trifluoromethyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate,(triphenyl, pentafluorophenyl)borate, [tris(pentafluorophenyl), phenyl] borate, tridecahydride-7,8-dicarbaundecaborate and the like may be mentioned. Among them, tetrakis(pentafluorophenyl)borate is preferable.

The boron anion described above may be used as the ionic compound in combination with a cation. Such a cation may include, for example, the carbonium cation, the oxonium cation, the amine cation, the phosphonium cation, the cyclohepthatrienyl cation, the ferrocenium cation having the transition metal. The carbonium cation may include trisubstituted carbonium cations such as the triphenyl carbonium cation, the tri(substituted phenyl)carbonium cation and the like. The tri(substituted phenyl)carbonyl cation may include, in particular, the tri(methylphenyl)carbonium cation and the like. The amine cation may include trialkylammonium cations such as the trimethyl ammonium cation, the triethyl ammonium cation, the tripropyl ammonium cation, the tributyl ammonium cation and the like; the N,N-dialkyl anilinium cations such as the N,N-dimethyl anilinium cation, the N,N-diethyl anilinium cation, the N,N-2,4,6-pentamethyl anilinium cation and the like; and the dialkyl ammonium cations such as the diisopropyl ammonium cation, the dicyclohexyl ammonium cation and the like. The phosphonium cation may include the triarylphosphonium cations such as the triphenylphosphonium cation, the tri(methylphenyl)phosphonium cation, the tri(dimethylphenyl)phosphonium cation and the like. Among them, the N,N-dialkyl anilinium cation or the carbonium cation is preferable, and the N,N-dialkyl anilinium cation is particularly preferable. As the ionic compound described above, accordingly, N, N-dimethyl anilinium tetrakis(pentafluorophenyl)borate, triphenyl carbonium tetrakis(pentafluorophenyl)borate and the like are preferable. Preferably, a molar amount of the ionic compound composed of the boron anion and the cation to add is 0.1 to 10 times that of the metallocene-based complex catalyst described above, and more preferably 1 time.

In the above third polymerization catalyst composition, it is necessary to use the metallocene-based complex catalyst and the boron anion that are described above. However, the boron anion present in the reaction system for reacting the metallocene catalyst expressed by the formula (XVI) set forth above with the organoaluminum compound hinders synthesis of the metallocene-based complex catalyst as expressed by the above formula (XV). For the preparation of the third polymerization catalyst composition, therefore, it is necessary to preliminarily synthesize the metallocene-based complex catalyst and isolate and purify the metallocene-based complex catalyst before combining with the boron anion.

The co-catalyst that may be used for the third polymerization catalyst composition may preferably be, for example, in addition to the organoaluminum compound represented by $AlR^K R^L R^M$ mentioned above, aluminoxane and the like. As the aluminoxane, alkyl aminoxane is preferred and, for example, methylaluminoxane (MAO), modified methylaluminoxane and the like may be mentioned. As the modified methylaluminoxane, MMAO-3A (produced by Tosoh Finechem Corporation) and the like are preferable. Note that these aluminoxanes may be used alone or in combination of two or more others.

—Coupling Process—

A coupling process is carried out to cause a denaturing reaction (a coupling reaction) of at least a portion (for example, the terminal) of a polymer chain of the copolymer by the first polymerization reaction method or the second polymerization reaction method described above.

In the coupling process, the coupling reaction is preferably caused when the polymerization reaction reaches 100%.

A coupling agent used for the coupling reaction is not particularly limited but may be appropriately selected based on an intended purpose and may be, for example, a tin-containing compound such as (i) a tin-contaiing compound such as bis (maleic acid-1-octadecyl) dioctyltin (IV), (ii) an isocyanate compound such as 4,4'-diphenylmethane diisocyanate and the like, and (iii) an alkoxysilane compound such as glycidylpropyltrimethoxysilane and the like. These compounds may be used alone or in combination with two or more others.

Among them, bis(maleic acid-1-octadecyl)dioctyltin (IV) is preferable, in terms of reaction efficiency and low gel-formation.

Note that causing the coupling reaction may increase the number average molecular weight (Mn).

—Cleaning Process—

The cleaning step is a step of cleaning the isoprene copolymer obtained in the polymerization process. A medium used for the cleaning is not particularly limited and may be appropriately selected based on an intended purpose and may be, for example, methanol, ethanol, isopropanol and the like. However, when a catalyst derived from the Lewis acid is mixed in the polymerization catalyst composition, acid (for example, hydrochloric acid, sulfuric acid, and nitric acid) may be added particularly to those solvents. A molar amount of the acid to add is preferably no more than 15 mol % with respect to that of the solvent. When more acid is added, the acid may remain in the polymer, adversely affecting reactions in kneading and in vulcanizing.

The cleaning process described above may appropriately reduce an amount of residual catalyst in the polymer.

(Rubber Composition)

A rubber composition of the present invention contains at least rubber component and, if necessary, a filler, a crosslinking agent, and other components.

—Rubber Component—

The rubber component contains at least the isoprene copolymer described above and, if necessary, other rubber components.

The synthesized isoprene copolymer is as described above.

A total blending quantity (total content) of the polymer (the synthetic polyisoprene, the isoprene copolymer, or a combination of the synthetic polyisoprene and the isoprene copolymer) in the rubber component is not particularly limited but may be appropriately selected according to an intended purpose, and preferably 15 mass % to 100 mass %.

When the total blending quantity of the polymer in the rubber component exceeds 15 mass %, the effect of the polymer may be fully exerted.

—Other Rubber Components—

The other rubber components are not particularly limited but may be appropriately selected according to an intended purpose and may be, for example, polyisoprene, butadiene rubber (BR), styrene-butadiene rubber (SBR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluorine rubber, or urethane rubber. Those rubber components may be used alone or in combination with one or more others.

—Filler—

The fillers are not particularly limited but may be appropriately selected according to an intended purpose and may be, for example, carbon black and inorganic fillers. Preferably, the filler is at least one selected from carbon black and the inorganic filler. Here, more preferably, the rubber composition contains carbon black. Note that the filler is blended with the rubber composition in order to improve reinforcing properties and the like.

An amount of the filler (the filler content) is not particularly limited but may be selected according to an intended purpose, and preferably, with respect to 100 parts by mass of the rubber component, 10 to 100 parts by mass, more preferably 20 to 80 parts by mass, particularly preferably 30 to 60 parts by mass.

When the amount of the filler is under 10 parts by mass, there may not be much effect of adding the filler, while over 100 parts by mass of the filler may not blend into the rubber component, thereby reducing performance of the rubber composition.

—Carbon Black—

The carbon black is not particularly limited but may be appropriately selected according to an intended purpose and may be, for example, FEF, GPF, SRF, HAF, N339, IISAF, ISAF, and SAF. The carbon black may be used alone or in combination with one or more of them.

A nitrogen adsorption specific surface area of the carbon black (measured in accordance with $N_2SA$, JIS K 6217-2: 2001) is not particularly limited but may be appropriately selected according to an intended purpose, and preferably 20 to 100 m$^2$/g, more preferably 35 to 80 m$^2$/g.

When the nitrogen adsorption specific surface area of the carbon black ($N_2SA$) is smaller than 20 m$^2$/g, the obtained rubber has low durability, possibly hindering obtainment of sufficient crack growth resistance. When the nitrogen adsorption specific surface area of the carbon black ($N_2SA$) exceeds 100 m$^2$/g, the low loss factor decreases, possibly causing poor workability.

The carbon black content relative to 100 parts by mass of the rubber component is not particularly limited but may be appropriately selected according to an intended purpose, and preferably 10 to 100 parts by mass, more preferably 10 to 70 parts by mass, particularly preferably 20 to 60 parts by mass.

When the carbon black content is less than 10 parts by mass, fracture resistance may deteriorate due to insufficient reinforcing property. When the carbon black content exceeds 100 parts by mass, the workability and the low loss factor may be deteriorated.

On the other hand, when the carbon black content is within the more preferable range, it is advantageous in terms of balancing each of the properties.

—Inorganic Filler—

The inorganic filler is not particularly limited but may be appropriately selected according to an intended purpose and may be, for example, silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, barium sulfate or the like. Those inorganic fillers may be used alone or in combination with one or more of them.

In using the inorganic filler, also, a silane coupling agent may be used appropriately.

—Crosslinking Agent—

The crosslinking agent is not particularly limited but may be appropriately selected according to an intended purpose and may be, for example, a sulfur-based crosslinking agent, an organic peroxide crosslinking agent, an inorganic crosslinking agent, a polyamine crosslinking agent, a resin crosslinking agent, a sulfur compound-based crosslinking agent, an oxime-nitrosamine-based crosslinking agent or the like. Among them, the sulfur-based crosslinking agent is more preferable for the rubber composition for a tire.

The crosslinking agent content is not particularly limited but may be appropriately selected according to an intended purpose and may be preferably, with respect to 100 parts by mass of the rubber component, 0.1 parts by mass to 20 parts by mass.

When the crosslinking agent content is less than 0.1 parts by mass, the crosslinking may hardly proceed. When the crosslinking agent content exceeds 20 parts by mass, the crosslinking is likely to proceed by some crosslinking agents during kneading, and physical properties of a vulcanizate may be impaired.

—Other Components—

As another component, a vulcanization accelerator may also be used, which may be a guanidine based, an aldehyde-amine based, an aldehyde-ammonia based, a thiazole based, a sulfonamide based, a thiourea based, a thiuram based, a dithiocarbamate based, or a xanthate based compound.

Further, as necessary, softening agents, vulcanizing agents, colorants, flame retardants, lubricants, foaming agents, plasticizers, processing aids, antioxidants, anti-aging agents, scorch retarders, ultraviolet inhibitors, antistatic agents, coloration inhibitors, and other known compounding agents may be used according to an intended use.

(Crosslinked Rubber Composition)

The rubber composition of the present invention may be used as a crosslinked rubber composition. The crosslinked rubber composition is not limited as long as being obtained by crosslinking the rubber composition and may be appropriately selected according to an intended purpose.

Conditions for the crosslinking are not particularly limited but may be appropriately selected according to an intended purpose, and preferably include temperature at 120° C. to 200° C. and a heating time for 1 to 900 minutes.

(Tire)

As long as using the rubber composition of the present invention or the crosslinked rubber composition, a tire of the present invention is not particularly limited but may be appropriately selected according to an intended purpose.

An application site of the rubber composition of the present invention or the crosslinked rubber composition is not particularly limited but may be appropriately selected according to an intended purpose and may be, for example, a tread, a base tread, a sidewall, side reinforcing rubber, a bead filler or the like.

Among them, the tread is an advantageous application site, in terms of durability.

As a method of manufacturing the tire, conventional methods may be employed. For example, on a tire forming drum, materials usually used for producing a normal tire such as a carcass layer formed of unvulcanized rubber and/or a code, a belt layer, a tread layer and the like are sequentially bonded to one another, and then the drum is removed to obtain a green tire. Next, the green tire is subjected to heating vulcanization according to a conventional method. Thereby, a desired tire (e.g., a pneumatic tire) may be produced.

(Use for Other Than Tire)

Other than the tire, the rubber composition of the present invention or the crosslinked rubber composition described above may be used for antivibration rubber, base isolation rubber, a belt (conveyor belt), a rubber crawler, various types of hoses and the like.

EXAMPLES

Hereinafter, the present invention will be described in more detail by using examples. However, the present invention is not limited to the examples described below.

Production Example 1

Method of Producing Polymer A (Synthetic Polyisoprene))

Within a globe box under a nitrogen atmosphere, into a 1-litter pressure-tight glass reactor, 7.35 μmol of tris bistrimethylsilylamide gadolinium $Gd[N(SiMe_3)_2]_3$, 7.35 μmol of bis(2-diphenylphosphinophenyl)amine, and 1.0 g of toluene were introduced, and thus obtained mixture was aged for 30 minutes. Subsequently, 1.84 mmol of triisobutyl aluminum and 5.0 g of toluene were added thereto and thus obtained mixture was aged for 30 minutes. Next, 7.35 μmol of triphenylcarbonium tetrakis (pentafluorophenyl) borate $[Ph_3C][B(C_6F_5)_4]$ was added thereto and thus obtained mixture was aged for 15 minutes. Then, the reactor was removed from the glove box, and 164.7 g of cyclohexane and 65 g of isoprene were added to the mixture for polymerization at 50° C. for 2 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer A was obtained, and a yield thereof was 65 g.

Production Example 2

Method of Producing Polymer B (Styrene-Isoprene Copolymer))

Within the globe box under the nitrogen atmosphere, into the 1-litter pressure-tight glass reactor, 9.43 μmol of tris bistrimethylsilylamide gadolinium $Gd[N(SiMe_3)_2]_3$, 9.43 μmol of bis(2-diphenylphosphinophenyl)amine, and 1.0 g of toluene were introduced, and thus obtained mixture was aged for 30 minutes. Subsequently, 1.41 mmol of triisobutyl aluminum and 5.0 g of toluene were added thereto and thus obtained mixture was aged for 30 minutes. Next, 7.35 μmol of triphenylcarbonium tetrakis (pentafluorophenyl) borate $[Ph_3C][B(C_6F_5)_4]$ was added thereto and thus obtained mixture was aged for 15 minutes. Next, the reactor was removed from the glove box, and 1.7 g of styrene was added to the mixture, which was then stirred at 50° C. for 30 minutes. Then, 163.0 g of cyclohexane and 65 g of isoprene were added to the mixture for polymerization at 50° C. for 2 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer B was obtained, and a yield thereof was 59 g.

Production Example 3

Method of Producing Polymer C (Styrene-Isoprene Copolymer))

Within the globe box under the nitrogen atmosphere, into the 1-litter pressure-tight glass reactor, 9.43 μmol of tris bistrimethylsilylamide gadolinium $Gd[N(SiMe_3)_2]_3$, 9.43μmol of bis(2-diphenylphosphinophenyl)amine, and 1.0 g of toluene were introduced, and thus obtained mixture was aged for 30 minutes. Subsequently, 1.41 mmol of triisobutyl aluminum and 5.0 g of toluene were added thereto and thus obtained mixture was aged for 30 minutes. Next, 7.35 μmol of triphenylcarbonium tetrakis(pentafluorophenyl)borate $[Ph_3C][B(C_6F_5)_4]$ was added thereto and thus obtained mixture was aged for 15 minutes. Next, the reactor was removed from the glove box, and 3.4 g of styrene was added to the mixture, which was then stirred at 50° C. for 30 minutes. Then, 161.4 g of cyclohexane and 65 g of isoprene were added to the mixture for polymerization at 50° C. for 2 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer C was obtained, and a yield thereof was 62 g.

Production Example 4

Method of Producing Polymer D (Butadiene-Isoprene Copolymer): Applying the First Polymerization Reaction Method)

Within the globe box under the nitrogen atmosphere, into the 1-litter pressure-tight glass reactor, 9.43 μmol of tris bistrimethylsilylamide gadolinium $Gd[N(SiMe_3)_2]_3$, 9.43μmol of bis(2-diphenylphosphinophenyl)amine, and 1.0 g of toluene were introduced, and thus obtained mixture was aged for 30 minutes. Subsequently, 1.41 mmol of triisobutyl aluminum and 5.0 g of toluene were added thereto and thus obtained mixture was aged for 30 minutes. Next, 7.35 μmol of triphenylcarbonium tetrakis(pentafluorophenyl)borate $[Ph_3C][B(C_6F_5)_4]$ was added thereto and thus obtained mixture was aged for 15 minutes. Next, the reactor was removed from the glove box, and 1.7 g of 1,3-butadiene was added to the mixture, which was then stirred at 50° C. for 30 minutes. Then, 163.0 g of cyclohexane and 65 g of isoprene were added to the mixture for polymerization at 50° C. for 2 hours. After the polymerization, 1 mL of isopropanol containing 5 mass% of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer D was obtained, and a yield thereof was 61 g.

Production Example 5

Method of Producing Polymer E (Butadiene-Isoprene Copolymer): Applying the First Polymerization Reaction Method)

Within the globe box under the nitrogen atmosphere, into the 1-litter pressure-tight glass reactor, 9.43 μmol of tris bistrimethylsilylamide gadolinium $Gd[N(SiMe_3)_2]_3$, 9.43μmol of bis(2-diphenylphosphinophenyl)amine, and 1.0 g of toluene were introduced, and thus obtained mixture was aged for 30 minutes.

Subsequently, 1.41 mmol of triisobutyl aluminum and 5.0 g of toluene were added thereto and thus obtained mixture was aged for 30 minutes. Next, 7.35 μmol of triphenylcarbonium tetrakis(pentafluorophenyl)borate $[Ph_3C][B(C_6F_5)_4]$ was added thereto and thus obtained mixture was aged for 15 minutes. Next, the reactor was removed from the glove box, and 3.4 g of 1,3-butadiene was added to the mixture, which was then stirred at 50° C. for 30 minutes. Then, 161.4 g of cyclohexane and 65 g of isoprene were added to the mixture for polymerization at 50° C. for 2 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C.

Thereby, a polymer E was obtained, and a yield thereof was 63 g.

Production Example 6

Method of Producing Polymer F (Mixture of Polyisoprene and Polybutadiene): Applying the Second Polymerization Reaction Method)

Within the globe box under the nitrogen atmosphere, into the 1-litter pressure-tight glass reactor, 9.43 μmol of tris bistrimethylsilylamide gadolinium $Gd[N(SiMe_3)_2]_3$, 9.43 μmol of bis(2-diphenylphosphinophenyl)amine, and 1.0 g of toluene were introduced, and thus obtained mixture was aged for 30 minutes. Subsequently, 1.41 mmol of triisobutyl aluminum and 5.0 g of toluene were added thereto and thus obtained mixture was aged for 30 minutes. Next, 7.35 μmol of triphenylcarbonium tetrakis(pentafluorophenyl)borate $[Ph_3C][B(C_6F_5)_4]$ was added thereto and thus obtained mixture was aged for 15 minutes. Next, the reactor was removed from the glove box, and 161.4 g of cyclohexane, 3.4 g of 1,3-butadiene, and 65g of isoprene were added to the mixture for polymerization at 50° C. for 2 hours. After the polymerization, 1 mL of isopropanol containing 5 mass % of 2,2'-methylene-bis(4-ethyl-6-t-butylphenol) (NS-5) was added to stop the reaction, and thus obtained polymer was separated by using a great amount of methanol and vacuum-dried at 70° C. Thereby, a polymer F was obtained, and a yield thereof was 62 g.

The obtained polymers A to F were subjected to analyses of microstructure, isoprene content, number average molecular weight (Mn), molecular weight distribution (Mw/Mn), and glass transition temperature (Tg). Table 1 shows results of the analyses of the polymers A to E (1) The microstructures (cis-1, 4 bond content) of the polymers A to F were calculated by measuring a transmittance spectrum according to Fourier-transform infrared spectroscopy (FT-IR). In particular, as a blank of carbon disulfide in an identical cell, the transmittance spectrum of a carbon disulfide solution of each polymer prepared at concentration of 5mg/mL was measured by means of FT-IR and, by using values of e, f, and g derived from the following matrix equation (i):

[Chemical formula 12]

$$\begin{bmatrix} 1.7455 & 0 & -0.0151 \\ -0.0454 & 0.4292 & -0.0129 \\ -0.007 & 0 & 0.3746 \end{bmatrix} \begin{bmatrix} \log_{10}(a/d) \\ \log_{10}(a/b) \\ \log_{10}(a/c) \end{bmatrix} = \begin{bmatrix} e \\ f \\ g \end{bmatrix} \quad (i)$$

(provided that the a represents a mountain peak value around 1130 $cm^{-1}$ of the transmittance spectrum according to the Fourier-transform infrared spectroscopy (FT-IR); the b represents a valley peak value around 967 $cm^{-1}$; the c represents a valley peak value around 911$cm^{-1}$, and the d represents a valley peak value around 736$cm^{-1}$), a calculated value of cis-1,4 bond content was obtained from the following formula (ii):

(Calculated value of cis-1,4 bond content=$e/(e+f+g)$×100) (ii)

(2) Number average molecular weight (Mn) and molecular weight distribution (Mw/Mn)

By means of a gel permeation chromatography [GPC: HLC-8121GPC/HT Manufactured by Tosoh Corporation, column: two $GMH_{HR}$-H(S)HT manufactured by Tosoh Corporation, and a detector: a differential refractometer (RI)] using monodisperse polystyrene as a reference, the number average molecular weight (Mn) and the molecular weight distribution (Mw/Mn) of the polymers A to F in terms of polystyrene were obtained. The measurement temperature was 40° C.

(3) Glass transition temperature

A polymer for a measurement of glass transition temperature in a plate shape of approximately 60×10×1 mm in size was prepared, which was subjected to a dynamic viscoelasticity test under a programming rate of 3° C/min at a frequency of 1 Hz. Thereby, from a peak of tanδ, the glass transition temperature of an adhesive resin composition was measured.

TABLE 1

| | Polymer A | Polymer B | Polymer C | Polymer D | Polymer E | Polymer F |
|---|---|---|---|---|---|---|
| Mn (×10³) | 899 | 1224 | 1227 | 626 | 683 | 650 |
| Mw/Mn | 2.6 | 2.7 | 2.6 | 3.6 | 3.5 | 3.7 |
| Cis-1,4 bond content (%) | 98.1 | 98.2 | 98.2 | 97.9 | 97.9 | 98.0 |
| Tg (° C.) | −60.71 | −60.47 | −60.17 | — | −61.83 | — |
| Styrene addition amount (mol %) | — | 1.7 | 3.3 | — | — | — |
| Styrene polymerization degree (¹HNMR) | — | 3 | 7 | — | — | — |
| Styrene molecular weight calculated approximate value | — | 310 | 730 | — | — | — |
| Butadiene addition amount (mol %) | — | — | — | 3.1 | 62 | 6.0 |

<Evaluation Method of Rubber Composition>

Rubber compositions were prepared from compounding formulation shown in Table 2 and vulcanized at 160° C. for 20 minutes. Thus obtained cross-linked rubber compositions were subjected to evaluations of (1) fracture resistance, (2) abrasion resistance, and (3) crack-growth resistance (a constant stress) by employing methods described below. Results of the evaluation are shown in Table 2.

TABLE 2

| | Comparative example 1 | Comparative example 2 | Example 1 | Example 2 | Example 3 | Example 4 | Example 5 |
|---|---|---|---|---|---|---|---|
| Mixed compositions (parts by mass) | | | | | | | |
| Polymer A | 100 | 0 | 0 | 0 | 0 | 0 | 0 |
| Polymer B | 0 | 0 | 100 | 0 | 10 | 15 | 50 |

TABLE 2-continued

|  |  |  |  |  |  |  |  |
|---|---|---|---|---|---|---|---|
| Polymer C | 0 | 0 | 0 | 100 | 0 | 0 | 0 |
| Polymer D | 0 | 0 | 0 | 0 | 0 | 0 | 0 |
| Polymer E | 0 | 0 | 0 | 0 | 0 | 0 | 0 |
| Polymer F | 0 | 0 | 0 | 0 | 0 | 0 | 0 |
| Butadiene rubber BR01 (product of JSR Corporation) | 0 | 100 | 0 | 0 | 90 | 85 | 50 |
| Stearic acid | 2 | 2 | 2 | 2 | 2 | 2 | 2 |
| Carbon black | 50 | 50 | 50 | 50 | 50 | 50 | 50 |
| Anti-aging agent*1 | 1 | 1 | 1 | 1 | 1 | 1 | 1 |
| Zinc oxide | 3 | 3 | 3 | 3 | 3 | 3 | 3 |
| Vulcanization accelerator CZ-G*2 | 0.4 | 0.4 | 0.4 | 0.4 | 0.4 | 0.4 | 0.4 |
| Vulcanization accelerator DM-P*3 | 0.2 | 0.2 | 0.2 | 0.2 | 0.2 | 0.2 | 0.2 |
| Sulfur | 1.4 | 1.4 | 1.4 | 1.4 | 1.4 | 1.4 | 1.4 |
| Physical properties of crosslinked rubber composition | | | | | | | |
| Fracture resistance (index) | 100 | 95 | 108 | 117 | 96 | 96 | 102 |
| Abrasion resistance (index) | 100 | 96 | 105 | 111 | 95 | 97 | 101 |
| Crack-growth resistance (index) | 100 | 86 | 125 | 136 | 90 | 110 | 118 |

|  | Example 6 | Example 7 | Example 8 | Example 9 | Example 10 | Example 11 | Example 12 | Example 13 |
|---|---|---|---|---|---|---|---|---|
| Mixed compositions (parts by mass) | | | | | | | | |
| Polymer A | 0 | 0 | 0 | 0 | 0 | 0 | 0 | 0 |
| Polymer B | 80 | 0 | 0 | 0 | 0 | 0 | 0 | 0 |
| Polymer C | 0 | 0 | 0 | 0 | 0 | 0 | 0 | 0 |
| Polymer D | 0 | 100 | 0 | 0 | 10 | 15 | 50 | 80 |
| Polymer E | 0 | 0 | 100 | 0 | 0 | 0 | 0 | 0 |
| Polymer F | 0 | 0 | 0 | 100 | 0 | 0 | 0 | 0 |
| Butadiene rubber BR01 (product of JSR Corporation) | 20 | 0 | 0 | 0 | 90 | 85 | 50 | 20 |
| Stearic acid | 2 | 2 | 2 | 2 | 2 | 2 | 2 | 2 |
| Carbon black | 50 | 50 | 50 | 50 | 50 | 50 | 50 | 50 |
| Anti-aging agent*1 | 1 | 1 | 1 | 1 | 1 | 1 | 1 | 1 |
| Zinc oxide | 3 | 3 | 3 | 3 | 3 | 3 | 3 | 3 |
| Vulcanization accelerator CZ-G*2 | 0.4 | 0.4 | 0.4 | 0.4 | 0.4 | 0.4 | 0.4 | 0.4 |
| Vulcanization accelerator DM-P*3 | 0.2 | 0.2 | 0.2 | 0.2 | 0.2 | 0.2 | 0.2 | 0.2 |
| Sulfur | 1.4 | 1.4 | 1.4 | 1.4 | 1.4 | 1.4 | 1.4 | 1.4 |
| Physical properties of crosslinked rubber composition | | | | | | | | |
| Fracture resistance (index) | 105 | 105 | 110 | 106 | 96 | 96 | 102 | 103 |
| Abrasion resistance (index) | 104 | 103 | 108 | 104 | 94 | 96 | 101 | 103 |
| Crack-growth resistance (index) | 123 | 118 | 125 | 118 | 88 | 107 | 111 | 120 |

*1: N-(1,3-dimethlybutyl)-N'-p-phenylenediamine. Nocrac 6C produced by Ouchi Shinko Chemical Industrial Co., Ltd.
*2: N-cyclohexyl-2-benzothiazolyl sulfonamide, Nocceler CZ-G produced by Ouchi Shinko Chemical Industrial Co., Ltd.
*3: dibenzothiazyl disulfide. Nocceler DM-P produced by Ouchi Shinko Chemical Industrial Co., Ltd.

(1) Fracture Resistance (Iindex)

In compliance with JIS K 6301-1995, a tensile test was conducted at room temperature in order to measure a tensile strength (Tb) of the vulcanized rubber composition. Indices of the tensile strength relative to the tensile strength of Comparative example 1 that is set to 100 are shown in Table 2. The larger the index is, the better the fracture resistance is.

(2) Abrasion Resistance (Index)

By using a test sample in a disc shape (16.2 mm in diameter and 6 mm in thickness) cut out from each vulcanized rubber that has been prepared and, in compliance with JIS-K6264-2:2005, a DIN abrasion test was conducted. An abrasion amount ($mm^3$) obtained in the DIN abrasion test carried out at room temperature was measured. Indices (reciprocals of the abrasion amount) of the tensile strength relative to the tensile strength of Comparative example 1 that is set to 100 are shown in Table 2. The larger the index is, the better the abrasion resistance is.

(3) Crack-Growth Resistance (Index) (Constant Stress)

A crack of 0.5mm was generated at a center of a JIS3 test sample which then underwent cyclic fatigue under a constant strain of 100% (a measured value obtained by a tension test in compliance with JIS K6251) at room temperature. The number of times when the test sample was cut was measured. Results are shown in Table 2. The larger the index is, the better the crack-growth resistance is. Note that, in Table 2, >200 indicates that the test sample was not cut under the cyclic fatigue at the number of times twice that of Comparative Example 1.

As can be seen from Table 2, in Examples 1 to 13 of vulcanized rubber compositions using the isoprene copolymer (polymers B to F) of the present invention, crosslinked rubber compositions with durability (the fracture resistance, the abrasion resistance, and the crack-growth resistance) better than those of synthesized polyisoprene (the polymer A) and butadiene rubber were obtained.

INDUSTRIAL APPLICABILITY

The copolymer of the present invention and the rubber composition containing the copolymer may be preferably used for, for example, a tire material (in particular, a tread member of the tire).

The invention claimed is:

1. A method for producing a styrene-isoprene copolymer having a styrene block at a terminal thereof, the method comprising:
   polymerizing monomers in the presence of catalyst through at least two polymerization processes, wherein monomers forming the styrene-isoprene copolymer are styrene monomers and isoprene monomers;
   styrene monomers account for less than 5 mol % of all monomers forming the styrene-isoprene copolymer;
   cis-1,4 bond content of a portion derived from isoprene accounts for at least 97% in total; and
   in a first polymerization process, styrene monomers are polymerized without isoprene monomers.

2. The method according to claim 1, wherein the number of styrene monomer units per styrene block is no more than 10.

3. The method according to claim 1, wherein molecular weight per styrene block is no more than 1000.

4. The method according to claim 1, wherein the catalyst contains a rare earth element compound expressed by the following formula (i):

$$M\text{-}(NQ)^1(NQ)^2(NQ)^3 \qquad (i)$$

(provided that M represents at least one of a lanthanoid element, scandium, and yttrium, and "$(NQ)^1$, $(NQ)^2$ and $(NQ)^3$" represent amide groups that are identical to or different from one another having M-N bond).

5. The method according to claim 4, wherein an anionic ligand is further added.

* * * * *